(12) United States Patent
Hwang et al.

(10) Patent No.: US 9,773,190 B2
(45) Date of Patent: Sep. 26, 2017

(54) PRECISION CALIBRATION METHOD FOR HIGH-PRECISE ROTARY ENCODER

(71) Applicant: NATIONAL CHUNG-SHAN INSTITUTE OF SCIENCE AND TECHNOLOGY, Taoyuan (TW)

(72) Inventors: Yi-Yuh Hwang, Taipei (TW); Guang-Sheen Liu, Taoyuan (TW); Chin-Der Hwang, Hsinchu County (TW); Wei-Guo Chang, Taoyuan (TW); Chih-Ming Liao, Taoyuan (TW)

(73) Assignee: NATIONAL CHUNG-SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 73 days.

(21) Appl. No.: 14/981,815

(22) Filed: Dec. 28, 2015

(65) Prior Publication Data

US 2016/0110628 A1    Apr. 21, 2016

Related U.S. Application Data

(63) Continuation-in-part of application No. 14/101,343, filed on Dec. 10, 2013, now abandoned.

(51) Int. Cl.
| | |
|---|---|
| *G06K 9/52* | (2006.01) |
| *G06T 7/60* | (2017.01) |
| *G06K 9/62* | (2006.01) |
| *G06T 7/00* | (2017.01) |
| *G01D 5/347* | (2006.01) |
| *G01D 18/00* | (2006.01) |

(Continued)

(52) U.S. Cl.
CPC ............... *G06K 9/52* (2013.01); *G01B 11/26* (2013.01); *G01B 21/042* (2013.01); *G01D 5/30* (2013.01); *G01D 5/3473* (2013.01); *G01D 18/00* (2013.01); *G06K 9/32* (2013.01); *G06K 9/4671* (2013.01); *G06K 9/6201* (2013.01); *G06K 9/74* (2013.01); *G06T 7/0042* (2013.01); *G06T 7/60* (2013.01); *G01B 5/008* (2013.01); *G01B 11/005* (2013.01)

(58) Field of Classification Search
CPC .... G01B 21/042; G01B 5/008; G01B 11/005; G01B 7/008
See application file for complete search history.

(56) References Cited

U.S. PATENT DOCUMENTS

| | | |
|---|---|---|
| 3,692,414 A | 9/1972 | Hosterman et al. |
| 5,004,929 A | 4/1991 | Kakinoki et al. |

(Continued)

*Primary Examiner* — David J Makiya
*Assistant Examiner* — Kenneth J Malkowski
(74) *Attorney, Agent, or Firm* — Anova Law Group, PLLC

(57) ABSTRACT

The present invention mainly provides a precision calibration method for being applied in a high-precise rotary encoder system, wherein the primary technology feature of the precision calibration method is that: using a laser speckle image capturing module to capture N frames of laser speckle image from an optical position surface of a rotary encoding body, and then using image comparison libraries and particularly-designed mathematical equations to calculate N number of image displacements, so as to eventually calculate N number of primary variation angles and sub variation angles corresponding to the N frames of laser speckle image. Therefore, after the rotary encoding body is rotated by an arbitrary angle, an immediate angle coordinate can be precisely positioned according to the primary variation angles, the secondary variation angles and the N number of image displacements.

14 Claims, 17 Drawing Sheets

(51) Int. Cl.
   *G01B 11/26*   (2006.01)
   *G01D 5/30*    (2006.01)
   *G06K 9/32*    (2006.01)
   *G06K 9/46*    (2006.01)
   *G06K 9/74*    (2006.01)
   *G01B 21/04*   (2006.01)
   *G01B 5/008*   (2006.01)
   *G01B 11/00*   (2006.01)

(56) References Cited

U.S. PATENT DOCUMENTS

| | | |
|---|---|---|
| 5,831,719 A | 11/1998 | Berg et al. |
| 6,248,994 B1 * | 6/2001 | Rose ............... G01B 11/162 250/231.13 |
| 6,642,506 B1 * | 11/2003 | Nahum ............. G01B 3/205 250/231.13 |
| 6,674,893 B1 | 1/2004 | Abe et al. |
| 7,150,716 B2 | 12/2006 | Jones |
| 7,777,879 B2 * | 8/2010 | Baxter ............. G01D 5/3473 356/364 |
| 2003/0132372 A1 | 7/2003 | Lofthus et al. |
| 2005/0130783 A1 | 6/2005 | Standen |
| 2005/0206661 A1 | 9/2005 | Lugaresi |
| 2007/0247636 A1 * | 10/2007 | Matsuoka ............. G01P 3/36 356/498 |
| 2011/0283902 A1 | 11/2011 | Lugaresi |
| 2013/0226344 A1 | 8/2013 | Wong et al. |

\* cited by examiner

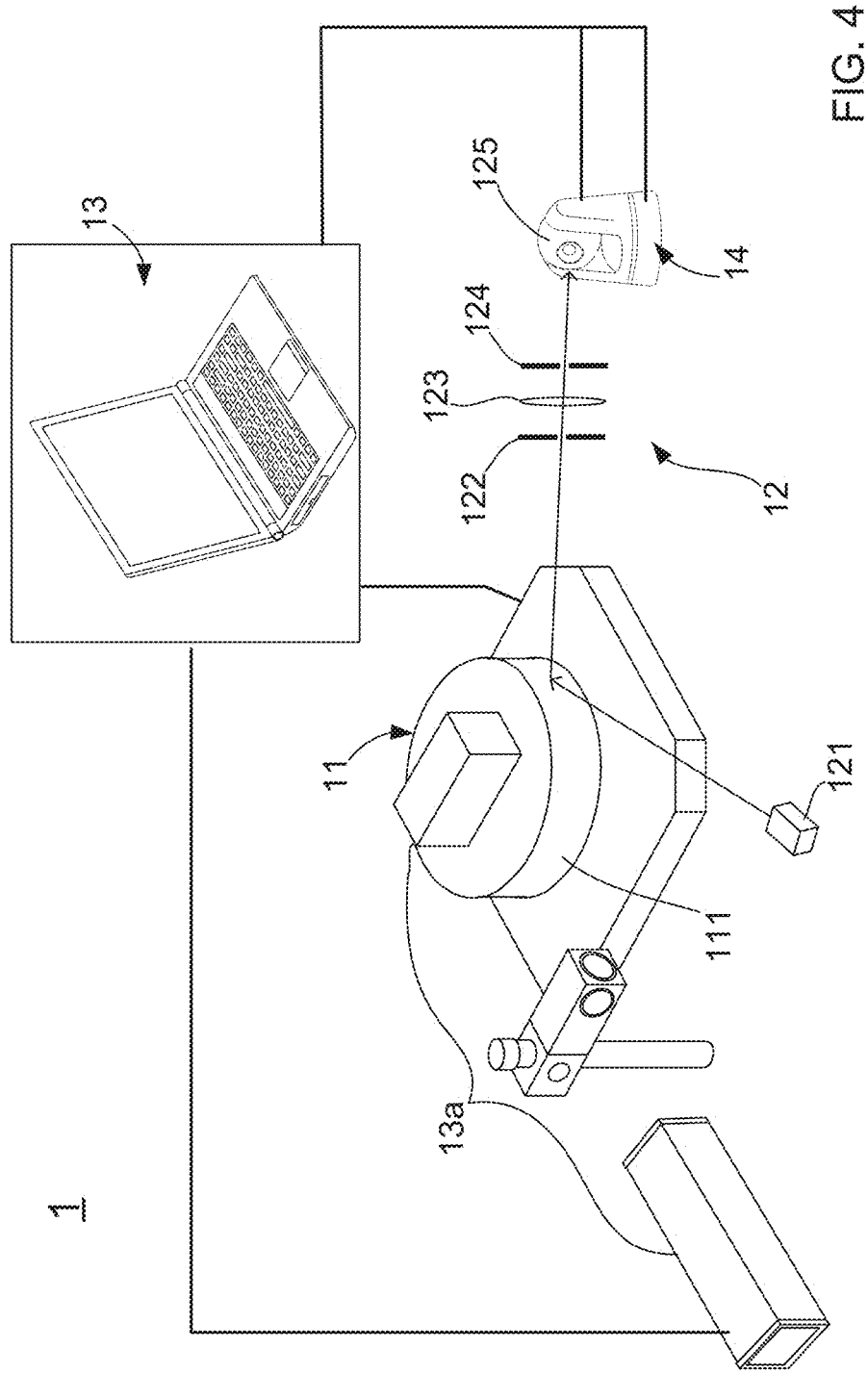

PRECISION CALIBRATION METHOD FOR HIGH-PRECISE ROTARY ENCODER

CROSS-REFERENCE TO RELATED APPLICATIONS

This application is a continuation-in-part of application Ser. No. 14/101,343 filed Dec. 10, 2013.

BACKGROUND OF THE INVENTION

1. Field of the Invention

The present invention relates to the technology field of angle encoders, and more particularly to a precision calibration method for high-precise rotary encoder.

2. Description of the Prior Art

During Second World War, magnetic angle encoders are developed and applied in tanks for facilitating the gun turret of the tank able to rotate by a precise angle under any harsh environments. Furthermore, with the development of science and technology, optical angle encoders are subsequently proposed.

Recently, the angle encoders have been fully developed. Please refer to FIG. 1, which illustrates a schematic framework view of an absolute positioning circular grating. As shown in FIG. 1, the absolute positioning circular grating 1' is developed and proposed by HEIDENHAIN and mainly consists of an inner annular grating 11' and an outer annular grating 12'. In which, the outer annular grating 12' and the inner annular grating 11' are designed to an equal spacing grating and an unequal spacing grating, respectively. Thus, by such grating arrangement, the absolute positioning circular grating 1' is able to carry out a precise and absolute angle coordinate with the use of multiple optical sensors.

Continuously referring to FIG. 2, where an arrangement diagram of the multiple optical sensors is shown. As shown in FIG. 2, eight equal angle position sensors 21' are respectively disposed at the positions of eight circular points, and eight unequal angle position sensors 22' are respectively disposed at the positions of eight triangular points. By such arrangement, when the absolute positioning circular grating 1' is rotated by a constant speed, the angle position information of the outer annular grating 12' and the inner annular grating 11' would be accessed by the equal angle position sensors 21' and the unequal angle position sensors 22', such that the precise and absolute angle coordinate of the absolute positioning circular grating 1' can be carried out after a complex cross-matching and calculation for the angle position information of the outer annular grating 12' and the inner annular grating 11' is completed.

Circular angle encoder having barcode proposed by ReniShaw is another optical angle encoder having been widely applied. Please refer to FIG. 3, which illustrates a schematic framework view of the circular angle encoder proposed by ReniShaw. As shown in FIG. 3, a barcode 22" consisting of a plurality of bright and dark patterns is formed on the circumferential surface 21" of circular angle encoder 2". Therefore, after accessing the bright and dark patterns of the barcode 22", it is able to obtain a high-precise angle coordinate of the circular angle coder 2" through graphical comparison.

Although the absolute positioning circular grating 1' developed by HEIDENHAIN and the circular angle encoder 2" proposed by ReniShaw have been widely applied, inventors of the present invention find that these two angel encoders still include following drawbacks and shortcomings:

(1) As FIG. 1 shows, because the inner annular grating 11' and the outer annular grating 12' are formed on a circular disk by using tool machining, it is able to know that the absolute positioning circular grating 1' naturally includes the drawback of graduation error.

(2) As FIG. 3 shows, since the barcode 22' consisting of bright and dark patterns are formed on the circumferential surface 21" of the circular angle encoder 2" through tool machining or etching process, it is able to know that the circular angle encoder 2" also naturally includes the drawback of graduation error. Moreover, when the said circular angle encoder 2" is connected to the center rotary shaft of a work equipment for practical application, the drawbacks of scanning error would be produced after the circular angle encoder 2" has been long-term used. Wherein the scanning error is resulted from the dirty and/or damages of the barcode 22".

Accordingly, in view of the absolute positioning circular grating 1' developed by HEIDENHAIN and the circular angle encoder 2" proposed by ReniShaw reveal many practically-used drawbacks, the inventor of the present application has made great efforts to make inventive research thereon and eventually provided a precision calibration method for high-precise rotary encoder.

SUMMARY OF THE INVENTION

The primary objective of the present invention is to provide a precision calibration method for being applied in a high-precise rotary encoder system, wherein the primary technology feature of the precision calibration method is that: using a laser speckle image capturing module to capture N frames of laser speckle image from an optical position surface of a rotary encoding body, and then using image comparison libraries and particularly-designed mathematical equations to calculate N number of image displacements, so as to eventually calculate N number of primary variation angles and sub variation angles corresponding to the N frames of laser speckle image. Therefore, after the rotary encoding body is rotated by an arbitrary angle, an immediate angle coordinate can be precisely positioned according to the primary variation angles, the secondary variation angles and the N number of image displacements. Moreover, a α rotation matrix is further proposed and used in this precision calibration method, and used for treating the image displacements with a displacement vector transforming process in order to effectively enhance the position precision of the high-precise rotary encoder system.

Accordingly, in order to achieve the primary objective of the present invention, the inventor of the present invention firstly provides a precision calibration method for being applied in a high-precise rotary encoder system, comprising steps of:

(1) providing the high-precise rotary encoder system comprising a rotary encoding body having an optical position surface, a laser speckle image capturing module having a 2D image sensor, an angle calibrating module, a controlling and processing module, and a deposing angle adjust module; wherein the deposing angle adjust module is connected to the 2D image sensor for making a precision calibration angle be included between the horizontal axis of the 2D image sensor and the horizontal axis of the rotary encoding body;

(2) making the rotary encoding body continuously rotate by a constant small angle until the rotary encoding body rotates a full circle, and using the laser speckle image capturing module to treat a laser speckle image capturing process to the optical position surface during the rotation of the rotary encoding body, so as to obtain N+1 frames of laser speckle image from the optical position surface and then store the N+1 frames of laser speckle image in a data base of the controlling and processing module; moreover, a plurality of primary variation angles being defined by the angle calibrating module as the N+1 frames of laser speckle image is captured;

(3) using at least one image comparison library comprised by the controlling and processing module to treat a first frame of laser speckle image and a (N+1)-th frame of laser speckle image in the N+1 frames of laser speckle image with a key features matching process, so as to calculate a particular image displacement;

(4) determining whether the particular image displacement is smaller than or equal to a small circumferential displacement produced as the rotary encoding body is rotated by the constant small angle, if yes, proceeding to step (5); otherwise, proceeding to the step (2);

(5) using the at least one image comparison library to treat each of two adjacent frames of laser speckle image in the N frames of laser speckle image with the key features matching process for obtaining N number of image displacements, and then N number of secondary variation angles corresponding to the N laser speckle image frames and the N number of image displacements being respectively calculated;

(6) immediately turning the rotary encoding body by an arbitrary angle and simultaneously using the laser speckle image capturing module to capture an immediate laser speckle image frame form the optical position surface; therefore, the controlling and processing module is able to calculate an immediate angle coordinate corresponding to the immediate laser speckle image by using the at least one image comparison library as well as based on the primary variation angles, the secondary variation angles and the N number of image displacements;

wherein when the step (5) is executed, a α rotation matrix is used for treating the image displacements with a displacement vector transforming process.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 4 shows a first framework view of a high-precise rotary encoder system;

DETAILED DESCRIPTION OF THE PREFERRED EMBODIMENTS

Figure 1:
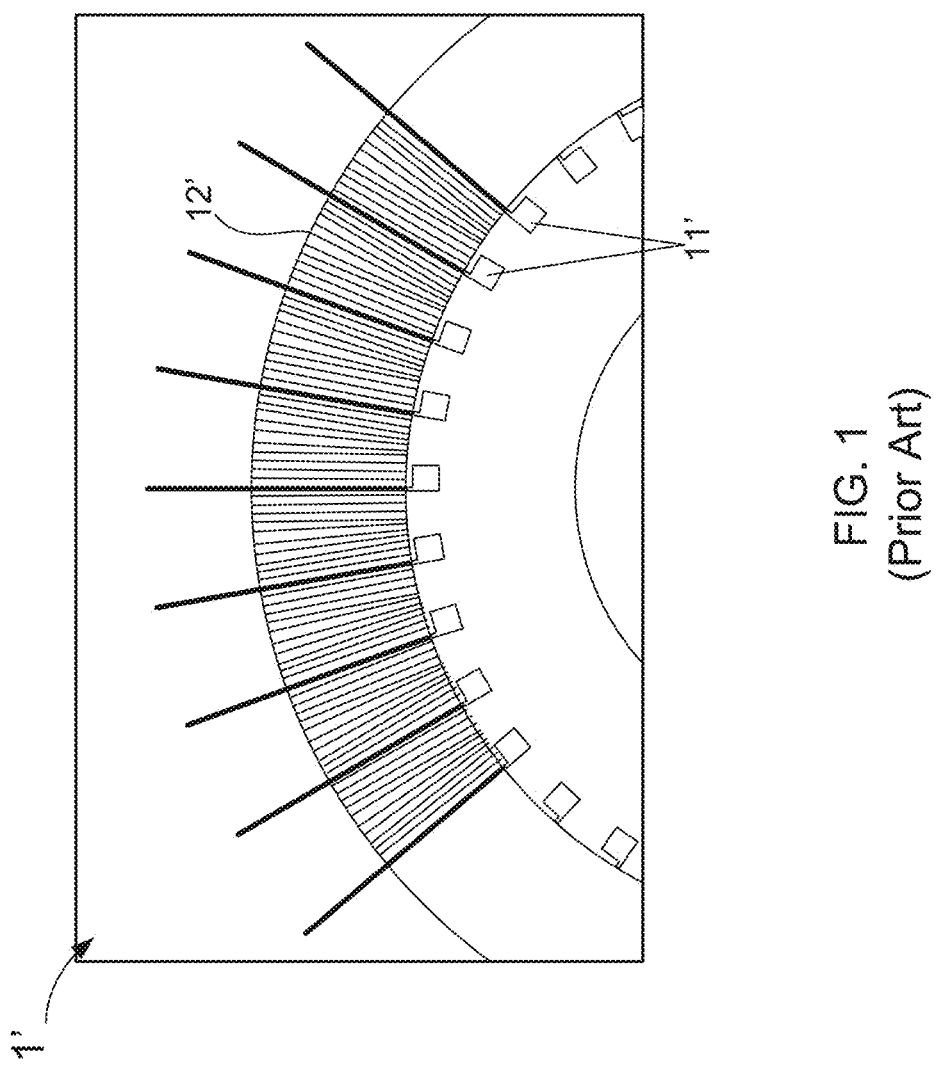
FIG. 1 shows a schematic framework view of an absolute positioning circular grating.
Figure 2:
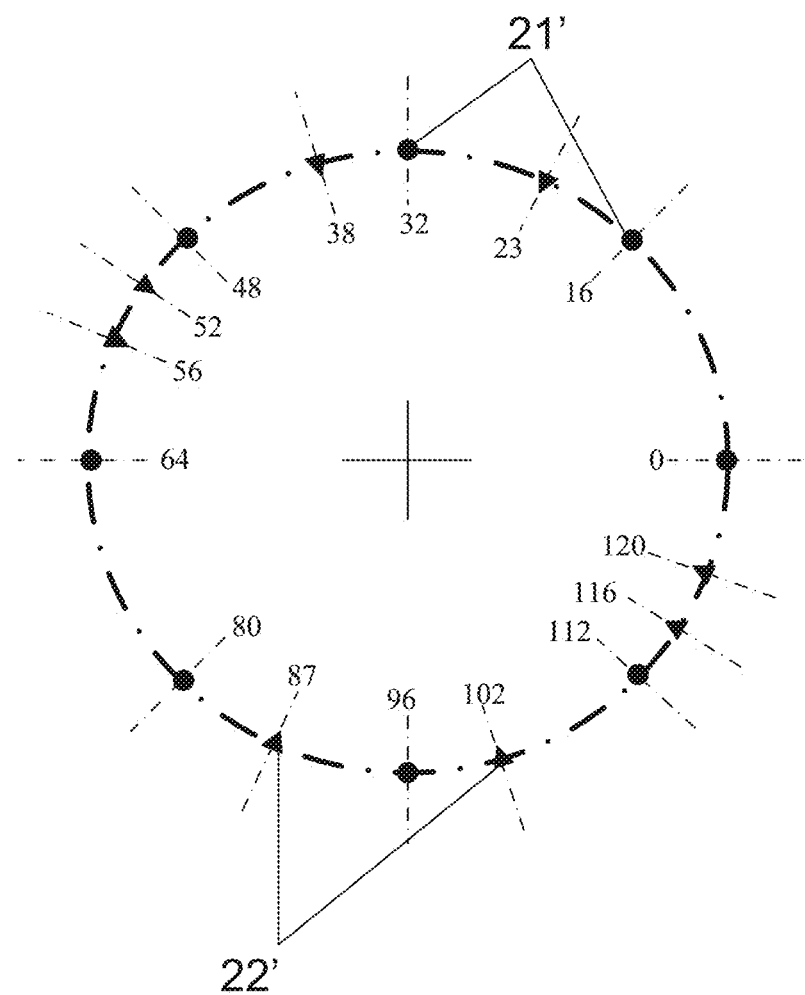
FIG. 2 shows an arrangement diagram of the multiple optical sensors.

To more clearly describe a precision calibration method for high-precise rotary encoder according to the present invention, embodiments of the present invention will be described in detail with reference to the attached drawings hereinafter.

Please refer to FIG. 4, which illustrates a first framework view of a high-precise rotary encoder system. As shown in FIG. 4, the high-precise rotary encoder system 1 consists of: a rotary encoding body 11, a laser speckle image capturing module 12 having a 2D image sensor 125, a controlling and processing module 13, an angle calibrating module 13a, and an angle adjusting module 14, wherein the rotary encoding body 11 has an optical position surface 111, and the controlling and processing module 13 has at least one image comparison library, at least one mathematical library and a data base. Moreover, the deposing angle adjust module 13a is connected to the 2D image sensor 125 for making a precision calibration angle α be included between the horizontal axis of the 2D image sensor 125 and the horizontal axis of the rotary encoding body 11.

Figure 5A:
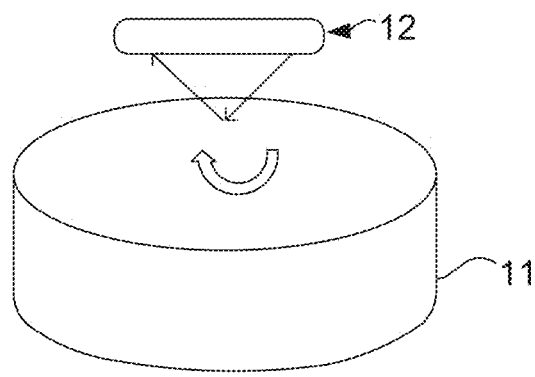
FIG. 5A shows a stereo view of a rotary encoding body.
Figure 5B:
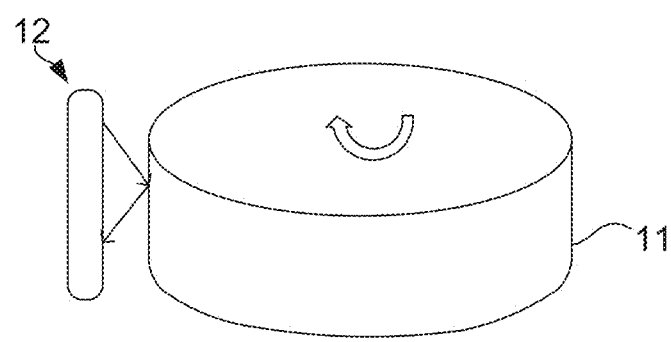
FIG. 5B shows stereo view of the rotary encoding body.
Figure 5C:
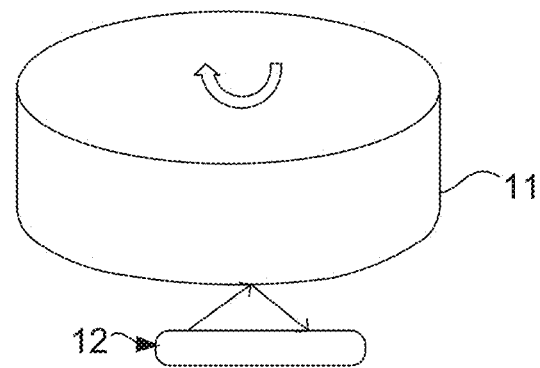
FIG. 5C shows stereo view of the rotary encoding body.

With reference to FIG. 5A, FIG. 5B, and FIG. 5C, where provide different stereo views of the rotary encoding body 11. In the high-precise rotary encoder system 1, the laser speckle image capturing module 12 coupled to the controlling and processing module 13 is used for emitting a coherence light (e.g., a laser light) to the optical position surface 111 of the rotary encoding body 11, such as emitting the laser light to the top surface of the rotary encoding body 11 (as shown in FIG. 5A), emitting the laser light to the side surface of the rotary encoding body 11 (as shown in FIG. 5B), or emitting the laser light to the bottom surface of the rotary encoding body 11 (as shown in FIG. 5C). After that, a reflective light of the laser light would emit from the optical position surface 111 to the 2D image sensor 125 of the laser speckle image capturing module 12, such that the 2D image sensor 125 would receive the reflective light and sense the laser speckle image from the reflective light.

The primary technology feature of the precision calibration method is that: using a laser speckle image capturing module 12 to capture N frames of laser speckle image from an optical position surface 111 of a rotary encoding body 11, and then using image comparison libraries and particularly-designed mathematical equations embedded in the controlling and processing module 13 to calculate N number of image displacements based on the N frames of laser speckle image, so as to eventually calculate N number of angle coordinates corresponding to the N frames of laser speckle image based on the plurality of image displacements. Moreover, a α rotation matrix is firstly proposed and used in this precision calibration method, and used for treating the image displacements with a displacement vector transforming process in order to effectively enhance the position precision of the high-precise rotary encoder system 1.

Figure 6:
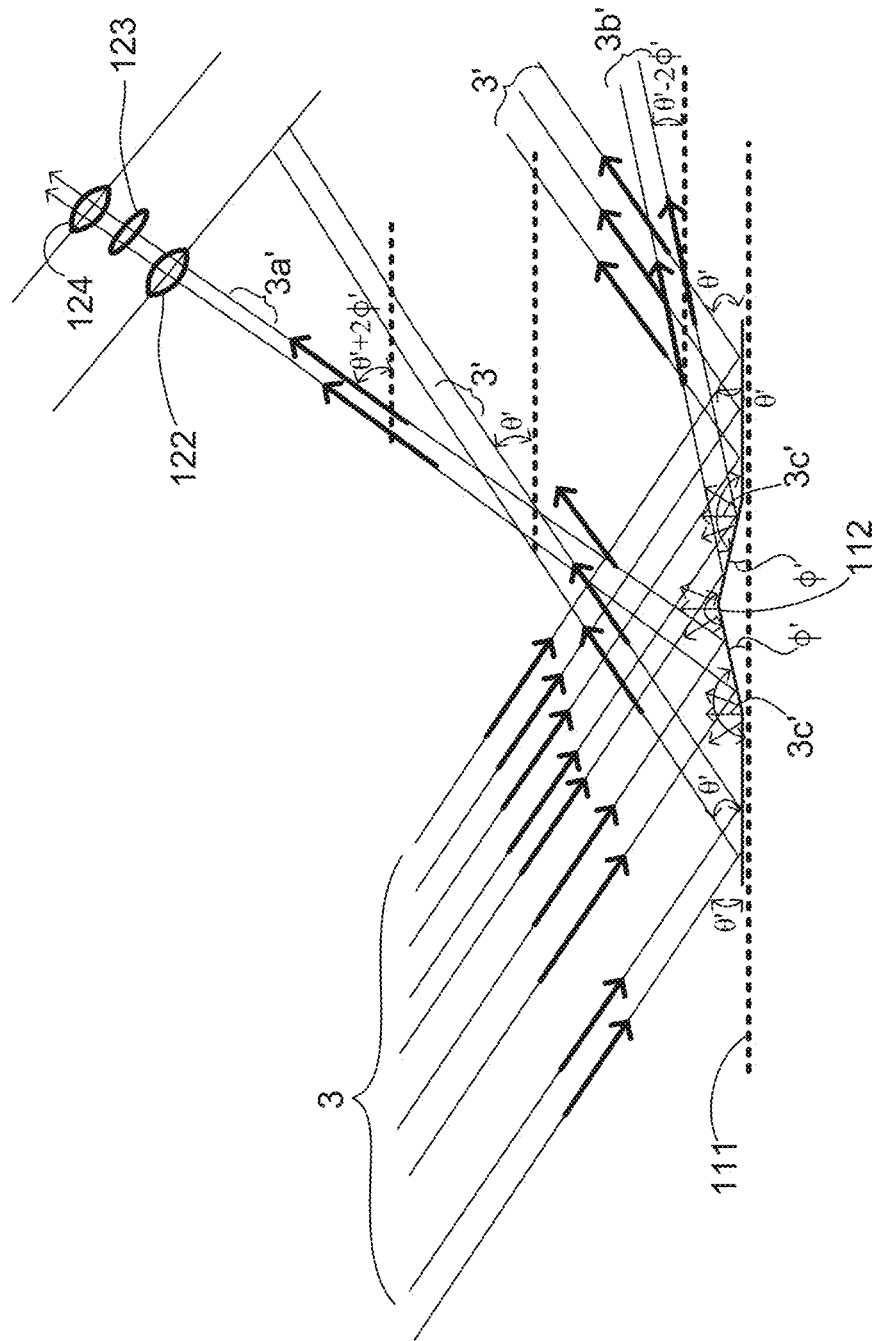
FIG. 6 shows a dynamic light-path diagram of a laser light when the laser light incidents onto an optical position surface of the rotary encoding body.

Continuously referring to FIG. 4, and please simultaneously refer to FIG. 6, which illustrates a dynamic light-path diagram of the laser light when the laser light incidents onto the optical position surface 111. As shown in FIG. 4 and FIG. 6, the laser speckle image capturing module 12 consists of: a light emitting device 121, a front-stage aperture 122, a lens 123, a rear-stage aperture 124, and a 2D image sensor 125, wherein the light-emitting device 121 is used for emitting the laser light 3 to the optical position surface 111 of the rotary encoding body 11. In addition, the front-stage aperture 122 is used for filtering scattering lights of the reflective light 3' of the laser light 3, and the rear-stage aperture 124 is used for controlling the size of laser speckles of the reflective light 3' received by the 2D image sensor 125. Moreover, the 2D image sensor 125 can be a CCD image sensor or a CMOS image sensor, which is used for sensing and recording the laser speckle image formed through the lens 123. It is worth further explaining that, when the laser light 3 incidents onto the optical position surface 111 of the rotary encoding body 11, for example, the side surface of the rotary encoding body 11, the laser speckle image sensed by 2D image sensor 125 from the reflective light 3' would be a laser speckle image having unique texture feature. The reason is that each of object surfaces of one single object has a unique 3D surface texture.

In order to ensure all the laser speckle images captured by the laser speckle image capturing module 12 would include their unique texture features, the laser speckle image capturing module 12 does not capture the laser speckle images from the optical position surface 111 based on traditional specular reflection framework. The primary reason is that, a zero-order beam (i.e., the reflective light 3' shown in FIG. 6) produced based on the principle of incident angle being equal to reflective angle is very easy to overlap with others high-order beam (i.e., the diffractive light 3c') which were diffracted from corners of the small object surfaces. That means the zero-order laser speckle image would be very easy to overlap with the high-order laser speckle images, so as to cause the laser speckle image sensed by the 2D image sensor 125 be not an image-invariant laser speckle image having unique texture feature.

As FIG. 4 and FIG. 6 show, the optical position surface 111 can be regarded as a plane object surface macroscopically; however, considering to the plane object surface microcosmically, the plane object surface is constructed by connecting many small object surfaces 112 to each other, wherein these small object surfaces 112 have different small angles, and the said small angle is defined as an included angle between the normal line of the small object surface 112 and the normal line of the plane object surface. From FIG. 6, it can find that the small object surfaces 112 having 0° included angle show the largest construction density in the optical position surface 111, so that these 0° small object surfaces 112 would provide maximum-energy laser speckle images to the 2D image sensor 125. However, these 0° small object surfaces 112 would also provide maximum-energy noise source to the 2D image sensor 125. The reason is that the 0° small object surfaces 112 are very easy to mixed with high-order diffracted light 3c', and the mixing speckle patterns are very easy change after a small displacement.

According to light reflection principle, if the included angle between the normal line of the small object surface 112 and the normal line of the plane object surface is Ø', then, it can find the reflective angle of the reflective light 3' is changed by 2Ø' degree when the incident angle of the laser light 3 irradiating onto the small object surface 112 is changed by Ø' degree, such that the original reflective light 3' becomes the reflective light 3a' shown as FIG. 6. Therefore, as long as letting the angle difference between the optical axis of the 2D image sensor 125 and the original reflective light 3' to be 2Ø' degree, the small object surfaces 112 would become an image-capturing surface for the 2D image sensor 125, such that the laser speckle images captured by the 2D image sensor 125 from the small object surfaces 112 must be image-invariant laser speckle images having unique texture feature. By such way, the 2D image sensor 125 is guaranteed to capture image-invariant laser speckle images having unique texture feature from the optical position surface 111 of the rotary encoding body 11 under a best signal-to-noise ratio. For instance, if the included angle between the normal line of the small object surfaces 112 and the normal line of the plane object surface (i.e., the optical position surface 111) is 5°, then these 5° small object surfaces 112 having unique texture feature becomes specular reflection image-capturing surface for the 2D image sensor 125 as long as letting angle difference between the optical axis of the 2D image sensor 125 and the original reflective light 3' to be 10°. Therefore, the laser speckle images captured by the 2D image sensor 125 from the 5° small object surfaces 112 must be image-invariant laser speckle images having unique texture feature. The reason is that, since the optical field phases of the imaging points in the specular reflection are identical, the 3D texture features of the 5° small object surfaces 112 would become luminous light spots sensed by the 2D image sensor 125. So that, the luminous light spots included by the captured laser speckle images are therefore taken as key feature points in the present invention. Herein, it needs to further explain that, the included angle between the optical axis of the 2D image sensor 125 and the said plane object surface (i.e., the optical position surface 111) becomes to θ'+10° after letting the angle difference between the optical axis of the 2D image sensor 125 and the original reflective light 3' to be 10°.

On the contrary, as FIG. 6 shows, if the included angle between the laser light 3 and the plane object surface (i.e., the optical position surface 111) is θ', then the included angle between the reflective light 3' and the 0° small object surfaces 112 shown in FIG. 6 would also be θ'. It is able to know that, the reflective light 3' reflected from the 0° small object surfaces 112 would not be sensed by the 2D image sensor 125 because of being blocked by the front-stage aperture 122 and the rear-stage aperture 124.

Embodiment I

Figure 3:
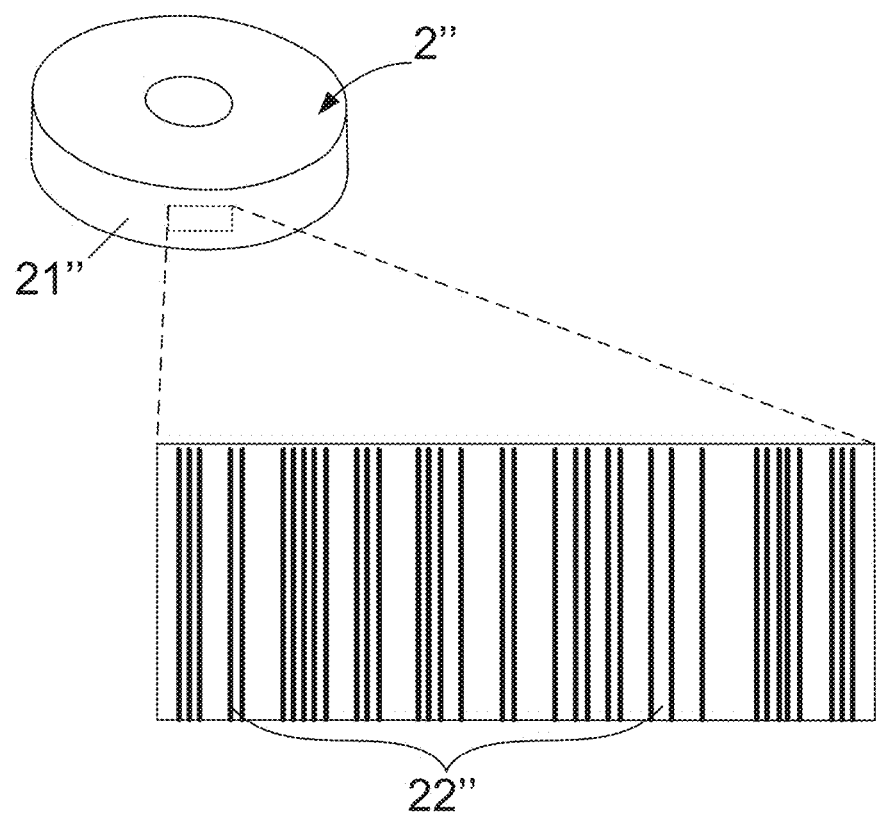
FIG. 3 shows a schematic framework view of the circular angle encoder proposed by ReniShaw.
Figure 7A:
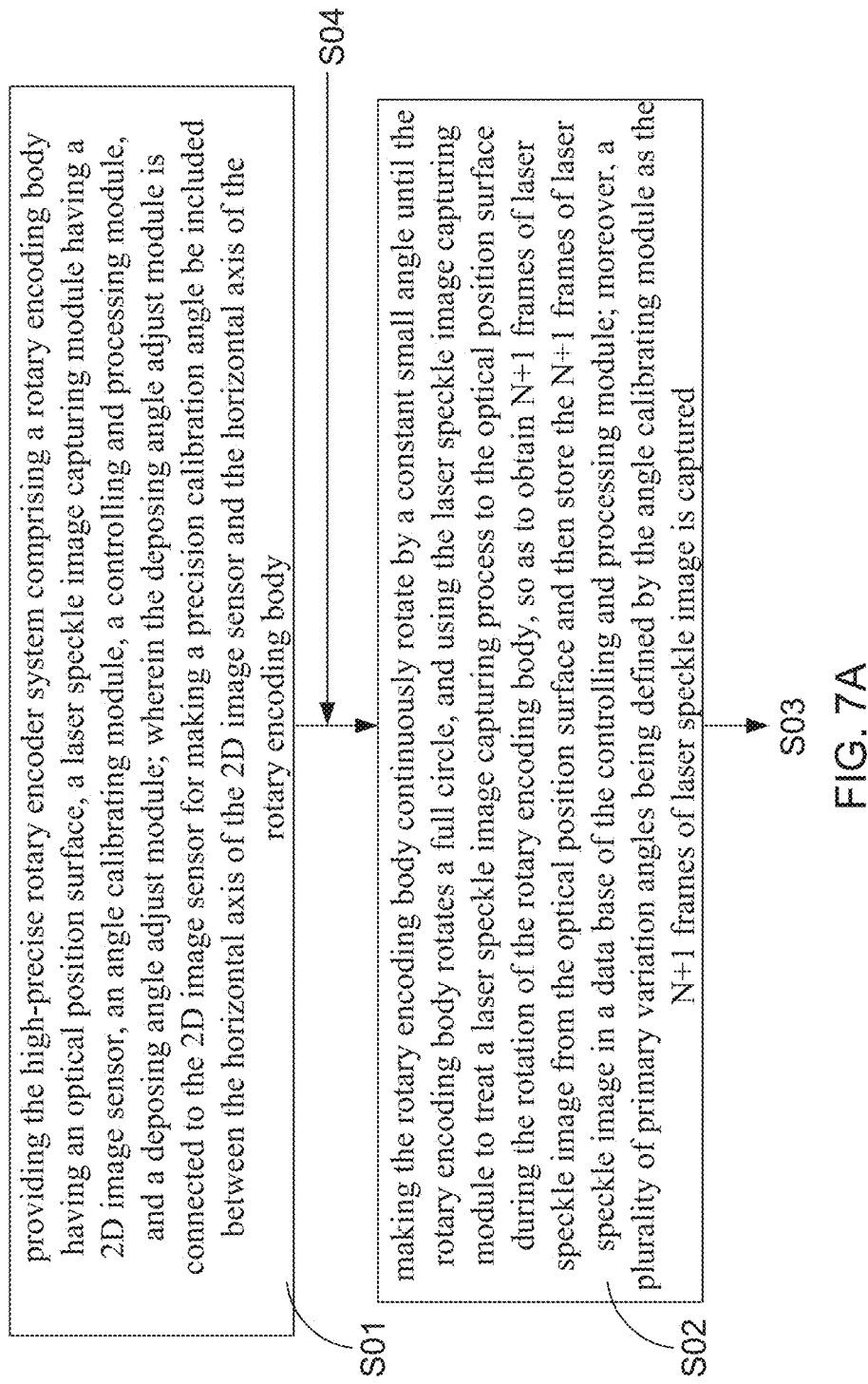
FIG. 7A, FIG. 7B, and FIG. 7C show flow charts of a precision calibration method for being applied in a high-precise rotary encoder system according to the present invention.
Figure 7B:
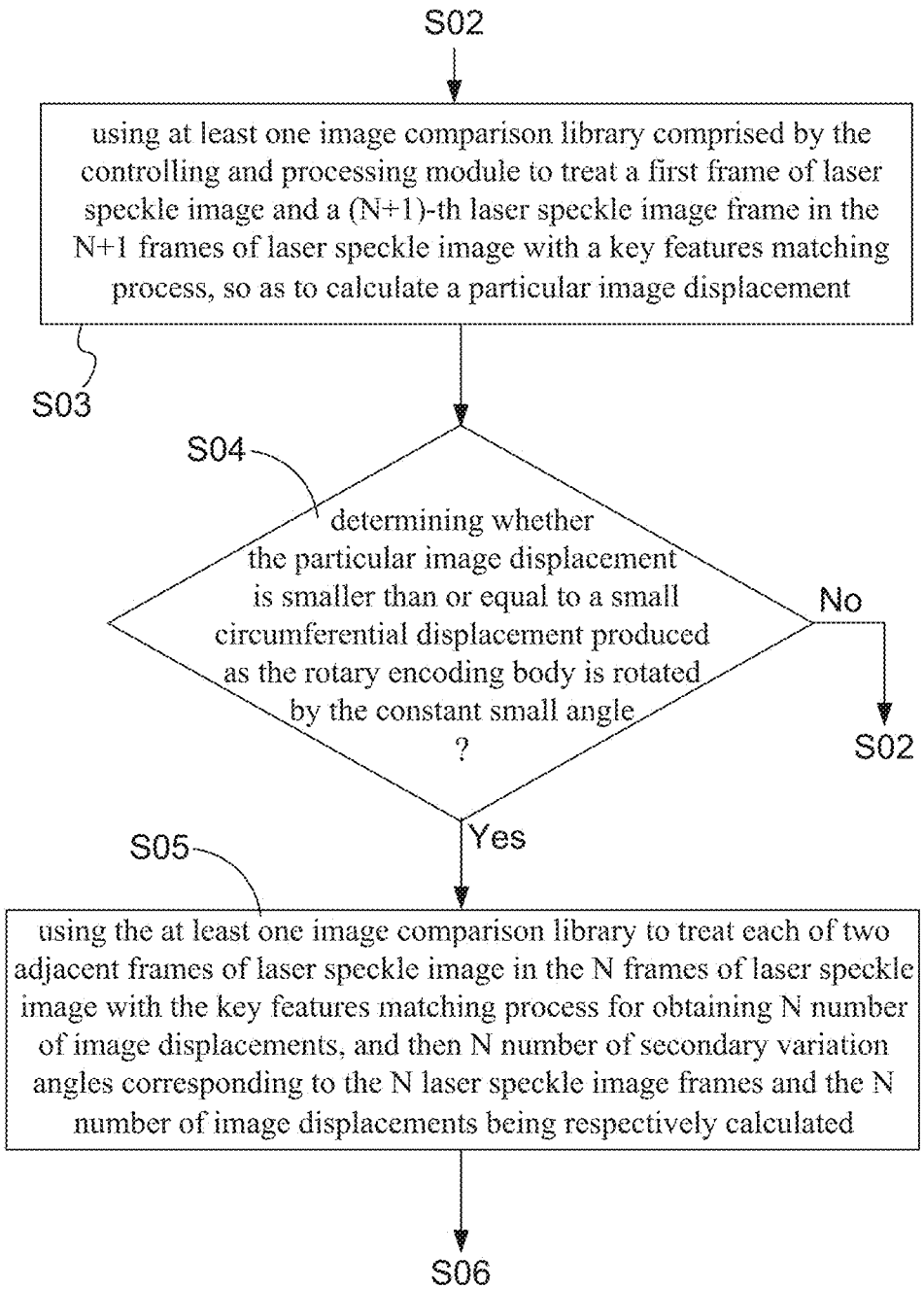
Figure 7C:
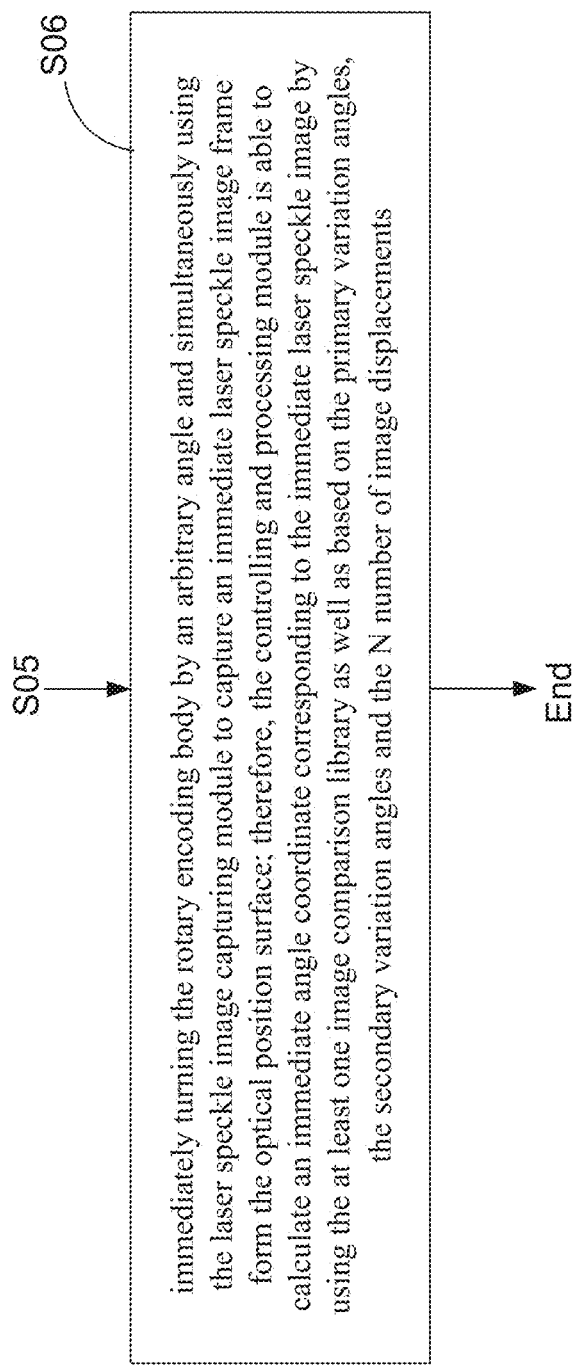

Referring to FIG. 4 again, and please simultaneously refer to FIG. 7A, FIG. 7B, and FIG. 7C, where provides flow chart of a precision calibration method for being applied in a high-precise rotary encoder system according to the present invention. As shown in FIG. 7A, the precision calibration method is first proceeded to step (S01) for providing the high-precise rotary encoder system 1 (as shown in FIG. 4) consisting of: a rotary encoding body 11, a laser speckle image capturing module 12 having a 2D image sensor 125, a controlling and processing module 13, an angle calibrating module 13a, and an angle adjusting module 14, wherein the rotary encoding body 11 has an optical position surface 111, and the controlling and processing module 13 has at least one image comparison library, at least one mathematical library and a data base. Moreover, the deposing angle adjust module 13a is connected to the 2D image sensor 125 for making a precision calibration angle α be included between the horizontal axis of the 2D image sensor 125 and the horizontal axis of the rotary encoding body 11. It is worth noting that, the said rotary encoding body 11 can be a cylindrical body or a rotary disk. Besides, the rotary encoding body 11 can also be the absolute positioning circular grating 1' (as shown in FIG. 1) developed by HEIDENHAIN and the circular angle encoder 2" (as shown in FIG. 3) proposed by ReniShaw. The primary reason is that, the angle coordinating technology of the present invention is to access the natural 3D texture feature of the optical position surface 111 of the rotary encoding body 11, but not to sense the annular gratings or read the barcodes pre-processed on the rotary encoding body 11.

Continuously, the method proceeds to step (S02) for making the rotary encoding body 11 continuously rotate by a constant small angle until the rotary encoding body 11 rotates a full circle, and using the laser speckle image capturing module 12 to treat a laser speckle image capturing process to the optical position surface 111 during the rotation of the rotary encoding body 11, so as to obtain N+1 frames of laser speckle image from the optical position surface 111 and then store the N+1 frames of laser speckle image in a data base of the controlling and processing module 13. Moreover, during the rotation of the rotary encoding body 11, a plurality of primary variation angles being defined by the angle calibrating module 13a as the N+1 frames of laser speckle image is captured.

Subsequently, the method proceeds to step (S03) for using at least one image comparison library comprised by the controlling and processing module to treat a first frame of laser speckle image and a (N+1)-th laser speckle image frame in the N+1 frames of laser speckle image with a key features matching process, so as to calculate a particular image displacement.

Figure 8:
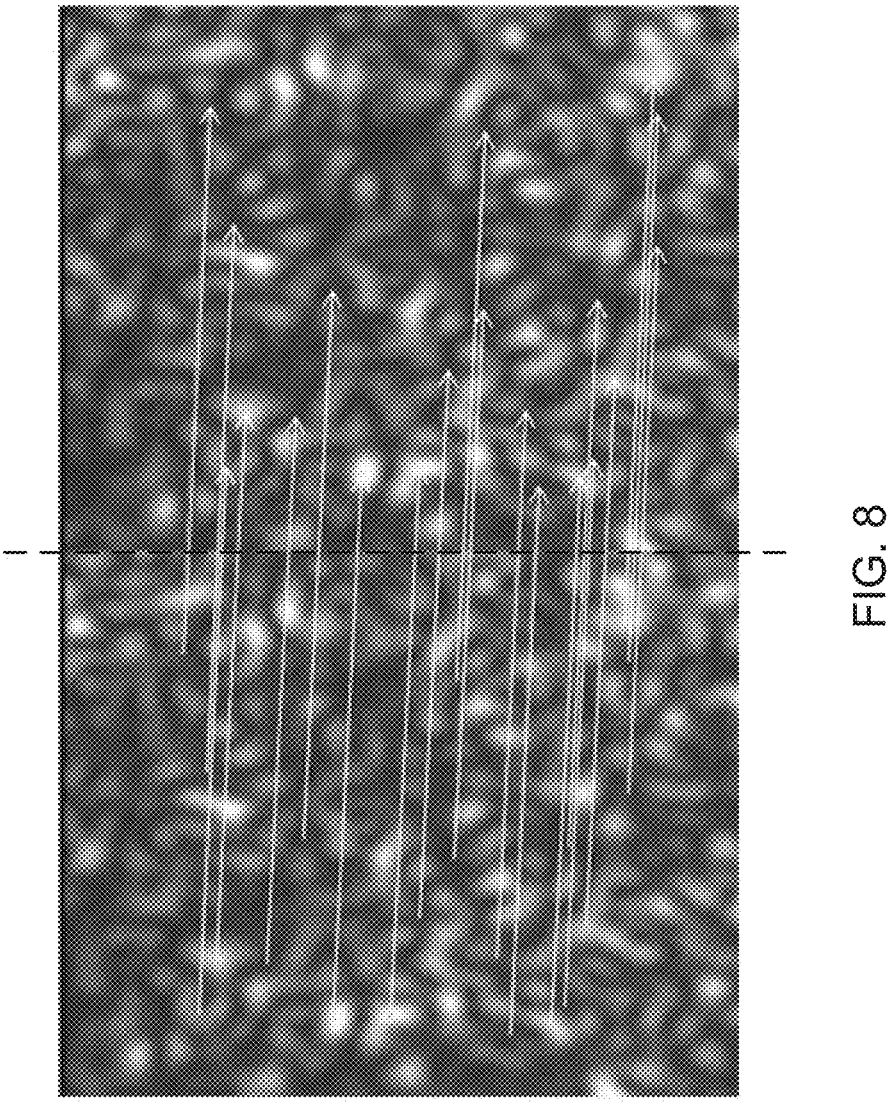
FIG. 8 shows a real image diagram including two adjacent frames of laser speckle image in the N frames of laser speckle image.

Please refer to FIG. 8, which shows a real image diagram of two adjacent frames of laser speckle image in the N frames of laser speckle image. Through at least one image comparison library, such as SIFT (Scale Invariant Feature Transform) or SURF (Speed Up Robust Feature), any two adjacent frames of laser speckle image can be completed with a key features matching process in the controlling and processing module 13. If taking SONY®XCL-5005 industrial camera (CCD chip size:3.45 µm×3.45 µm) produced by SONY company as the 2D image sensor 125, then, it is able to firstly eliminate the feature matching points greater than 1.5 fold of statistical displacement standard deviation when executing the key features matching process on the two adjacent frames of laser speckle image; thus, the comparison precision of the key features between two adjacent frames of laser speckle image can reach up to 0.008 pixel of displacement standard deviation of the object plane (i.e., the optical position surface 111). That means the position precision of the 2D image sensor 125 on the optical position surface 111 can reach up to 34.1 nm (34.1 nm=(3.45 µm×0.008)÷0.1), which is about 0.01 pixel of displacement standard deviation.

Herein, it needs to particularly note that, when using the laser speckle image capturing module 12 to treat the laser speckle image capturing process to the rotary encoding body 11 continuously rotating by a constant small angle, the image capture range of the 2D image sensor 125 must be smaller than or equal to a movable distance for guaranteeing the laser speckle image to be invariant; moreover, the image capture range of the 2D image sensor 125 must be greater than 2 fold of the circumference displacement (i.e., the object plane displacement) of the rotary encoding body 11 when the rotary encoding body 11 is rotated one time by the constant small angle. That means: the displacement of object plane $$\leq \frac{1}{2}$$

(image capture range)≤the movable distance for guaranteeing the laser speckle image to be invariant. Therefore, two adjacent frames of laser speckle image would have an overlapped image capture range greater than 0.5 fold of the image capture range base on such image-capturing limitations; so that, the two laser speckle images in the overlapped image capture range would reveal the same feature matching points.

Figure 9:
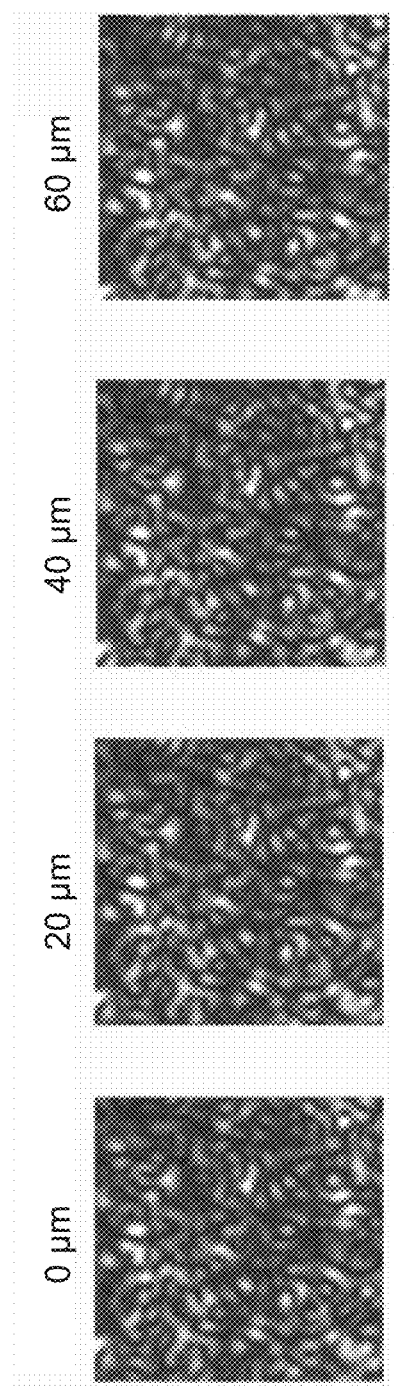
FIG. 9 shows a real image diagram including 4 laser speckle image frames adjacent to each other.

Please refer to FIG. 9, where provides a real image diagram including 4 laser speckle image frames adjacent to each other. In which, a first frame of laser speckle image and the first frame of laser speckle image has been treated with the key features matching process (abbreviated to "0-0 comparison"), the first frame of laser speckle image and a second frame of laser speckle image has been treated with the key features matching process (abbreviated to "0-20 comparison"), the first frame of laser speckle image and a third frame of laser speckle image has been treated with the key features matching process (abbreviated to "0-40 comparison"), and the first frame of laser speckle image and a fourth frame of laser speckle image has been treated with the key features matching process (abbreviated to "0-60 comparison"). Moreover, the results of 4-times key features matching processes are integrated in following Table (1).

TABLE (1)

| Image Frame (µm) | X-axis displacement (pixel) | Key Feature Point Matches |
|---|---|---|
| 0-0 | 0 | 466 |
| 0-20 | 4.27 | 293 |
| 0-40 | 8.54 | 175 |
| 0-60 | 12.8 | 96 |

From the Table (1), it can find that, because two adjacent frames of laser speckle image have larger or largest overlap region, there are show larger amount of identical key feature points between the two adjacent laser speckle image frames. However, with the increase of the displacement of the laser speckle image, for example, the displacement between the first laser speckle image frame and the fourth laser speckle image frame is 12.8 pixel, the identical key feature points between the two adjacent laser speckle image frames obviously reduce. That means the overlap region between the first laser speckle image frame and the fourth laser speckle image frame are reduced. So that, by using the image comparison library to treat two adjacent frames of laser speckle image with the key features matching process, it can not only calculate the image displacement between the two laser speckle image frames, but also can precisely calculate the position coordinates of the two image capture points on the optical position surface 111 for capturing the two laser speckle image frames.

Furthermore, the first laser speckle image frame and the first laser speckle image frame has been treated with the key features matching process (abbreviated to "0-0 comparison"), the first laser speckle image frame and the second laser speckle image frame has been treated with the key features matching process (abbreviated to "0-20 comparison"), the second frame of laser speckle image and the third frame of laser speckle image has been treated with the key features matching process (abbreviated to "20-40 comparison"), and the third frame of laser speckle image and the fourth frame of laser speckle image has been treated with the key features matching process (abbreviated to "40-60 comparison"). Moreover, the results of 4-times key features matching processes are integrated in following Table (2).

TABLE (2)

| Image Frame (μm) | X-axis displacement (pixel) | Key Feature Point Matches | Accumulated displacement (pixel) |
|---|---|---|---|
| 0-0 | 0 | 466 | 0 |
| 0-20 | 4.27 | 293 | 4.27 |
| 20-40 | 4.26 | 295 | 8.53 |
| 40-60 | 4.28 | 276 | 12.81 |

From the Table (2), it can find the image displacement between all of the two adjacent laser speckle image frames are almost identical, and the amount of identical key feature points between all of the two adjacent laser speckle image frames are almost the same (293, 295, and 276). Moreover, after comparing the accumulated displacement obtained from 0-0 comparison with the accumulated displacement obtained from 0-20 comparison, 20-40 comparison and 40-60 comparison, respectively, it can find all the displacement differences between the 0-0 comparison and 0-20 comparison, the 0-0 comparison and 0-40 comparison as well as the 0-0 comparison and 40-60 comparison falls in $$\pm \frac{1}{100}$$

pixel.

So that, when the particular image displacement obtained from the step (S03) is smaller than or equal to a small circumferential displacement (i.e., the object plane displacement) produced as the rotary encoding body 11 is rotated by the constant small angle, it is able to know that primary variation angle for the N+1 frames of laser speckle image has exceeded 360°, and then the laser speckle image capturing module 12 is stopped capturing the laser speckle image from the optical position surface 111.

Herein, it needs explain that, the angle calibrating module 13 used in the first framework of the high-precise rotary encoder system 1 is an Agilent® 5530 dynamic calibrator. Moreover, in the step (2), the primary variation angles are defined to $\theta_i \in \{\theta_1, \theta_2, \ldots, \theta_{N-1}, \theta_N\}$, wherein $\theta_1=0°$. Therefore, the method is proceeds to step (S05) after the step (S04) is carried out. When executing the step (S05), it is firstly using the at least one image comparison library to treat each of two adjacent frames of laser speckle image in the N frames of laser speckle image with the key features matching process for obtaining the N number of image displacements.

Figure 10:
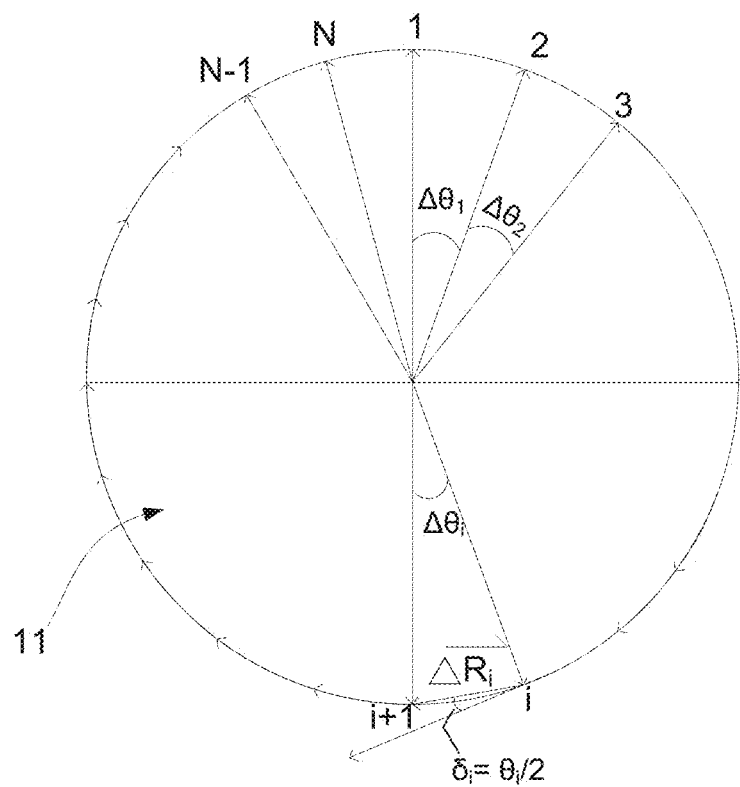
FIG. 10 shows a top view of the rotary encoding body.

Please refer to FIG. 10, which illustrates a top view of the rotary encoding body 11. After using the laser speckle image capturing module 12 to treat a laser speckle image capturing process to the optical position surface 111 during the rotary encoding body 11 continuously rotate by a constant small angle until rotating a full circle, there would have N frames of laser speckle image to be captured from the optical position surface 111. Herein, it needs to further explain that, "1", "2", "N−1", and "N" marked on the circumferential surface (i.e., the optical position surface 111) of the rotary encoding body 11 represent the image capturing points for the 2D image sensor 125.

As FIG. 10 shows, after rotating the rotary encoding body 11 by a constant small angle $\Delta\theta_i$, the position-fixed 2D image sensor 125 would captured a i-th frame of laser speckle image and a (i+1)-th frame of laser speckle image from the optical position surface 111. Thus, through the image comparison library, the displacement vector of these two laser speckle image frames can be obtained by the controlling and processing module 13, wherein the image displacement obtained from the i-th frame of laser speckle image and the (i+1)-th frame of laser speckle image is $\Delta d_i' = \Delta \vec{R}_1 = (dx_{Dec,i}', dy_{Dec,i}') = \Delta d_i'$. Furthermore, the chord length between the image capturing points i and i+1 can be calculated by using the mathematical equation of $|\vec{R}_1| = \sqrt{dx_i'^2 + dy_i'^2}$.

It is worth noting that, when taking SONY XCL-5005 industrial camera (CCD chip size:3.45 μm×3.45 μm) produced by SONY® company as the 2D image sensor 125, it is able to know the position precision of the 2D image sensor 125 falls in $$\pm \frac{1}{100}$$

pixel. That means the 2D image sensor 125 cannot detect the difference on the feature matching points between two adjacent laser speckle image frames once the vector displacement is smaller than $$\pm \frac{1}{200}$$

pixel $$\left( = \frac{3.45 \, \mu m}{200} = 17.25 \, nm \right).$$

So that, when the rotary encoding body 11 applied in the high-precise rotary encoder system 1 shown in FIG. 4 includes an outer radius of 20 cm, it is able to know the circumference length of the rotary encoding body 11 is 20π cm. Thus, after using the laser speckle image capturing module 12 to treat a laser speckle image capturing process to the optical position surface 111 along the circumference length by a constant object displacement of 20 μm, it eventually obtain the laser speckle image frames of $$\frac{20 \, \pi cm}{20 \, \mu m} = \pi \times 10^4.$$

Thus, the said constant small angle does therefore be calculated by using the mathematical equation of $$\frac{360°}{\pi \times 10^4} = 0.011°.$$

Moreover, as FIG. 10 shows, because the included angle $\delta_i$ of the displacement vector $\Delta \vec{R_1}$ and the tangential direction of the vertical axis of the rotary encoding body 11 is 0.0055° (=0.011°/2), a small circumferential displacement produced as the rotary encoding body 11 is rotated by the constant small angle can be calculated as follows: $\Delta d_i$= $(dx_{encoder,i}, dy_{encoder,i})$=(20 µm×cos(0.0055°), 20 µm×sin (0.0055°))=(20 µm, 1.92×10$^{-3}$ µm). Therefore, since the vertical displacement component of the small circumferential displacement of the rotary encoding body 11 is smaller than 17.25 nm, such small vertical displacement component (1.92×10$^{-3}$ µm) cannot be correctly detected by the 2D image sensor 125. In generally condition, the 2D image sensor 125 would regard such small vertical displacement component as 0 um.

Inheriting to above descriptions, when the small circumferential displacement of the rotary encoding body 11 cannot be detected by the 2D image sensor 125, there has a dark light spots error produced during the controlling and the processing module 13 executes the key features matching process on all of the two adjacent frames of laser speckle image, and such phenomenon is called dark light spots effect.

Figure 11:
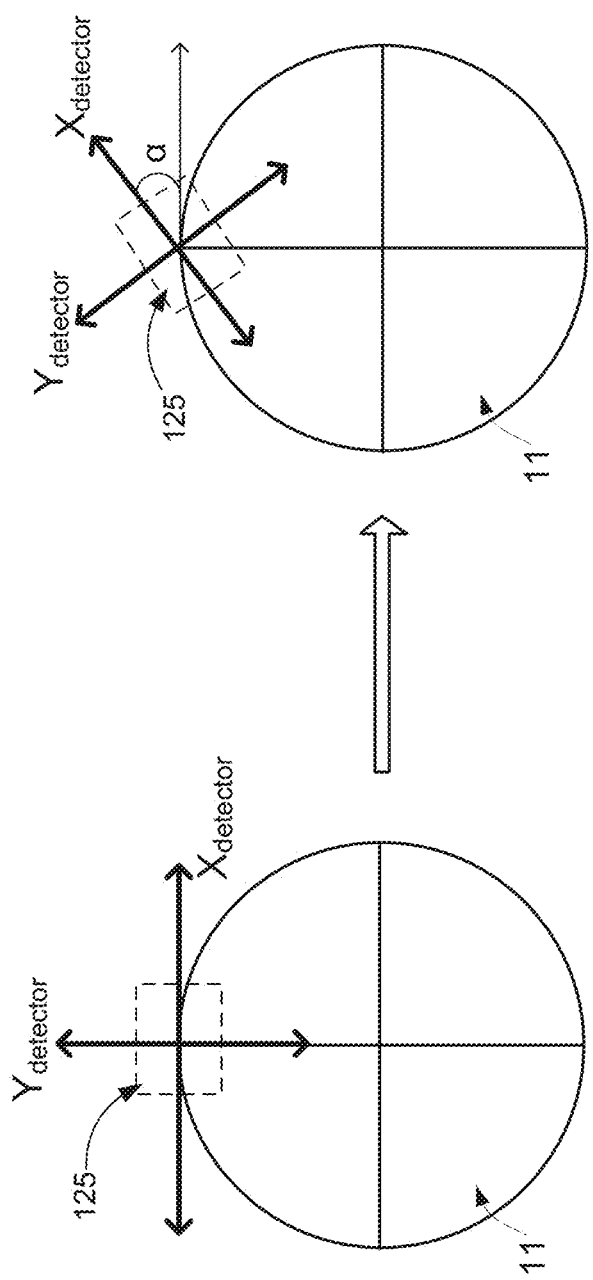
FIG. 11 shows a top view of the rotary encoding body.

Please continuously refer to FIG. 11, which illustrates the top view of the rotary encoding body 11. In order to solving influence of dark light spots effect, an angle adjusting module 14 (as shown in FIG. 4) is connected to the 2D image sensor 125, so as to adjust the disposing angle of the 2D image sensor 12 for making a precision calibration angleα be included between the horizontal axis of the 2D image sensor 125 and the horizontal axis of the rotary encoding body 11. When 2D image sensor 125 is rotated with angle α, N number of image displacements has been obtained after completing the execution of key features matching processes on all of the laser speckle image frames, including: $\Delta d_1', \Delta d_2', \ldots, \Delta d_N'$. Thus, it is able to precisely find the corresponding object plane displacements by using the said α rotation matrix represented by mathematical formula (1):

$$(dx_{encoder,i}, dy_{encoder,i}) = (dx'_{Dec,i}, dy'_{Dec,i}) \begin{bmatrix} \cos\alpha & -\sin\alpha \\ \sin\alpha & \cos\alpha \end{bmatrix} \quad (1)$$

In the α rotation matrix, $\Delta d_i$=$(dx_{encoder,i}, dy_{encoder,i})$= $\Delta \vec{R_{encoder,1}}$ represents a small circumferential displacement (i.e., the object plane displacement) produced as the rotary encoding body 11 is rotated by the constant small angle, and $\Delta d_i'$=$(dx_{Dec,i}', dy_{Dec,i}')$=$\Delta \vec{R_{Dec,1}}$ represents a i-th image displacement between a i-th frame of laser speckle image and a (i+1)-th frame of laser speckle image detected by the 2D image sensor 125. Moreover, α represents the precision calibration angle included between the horizontal axis of the 2D image sensor 125 and the horizontal axis of the rotary encoding body 11.

Figure 12:
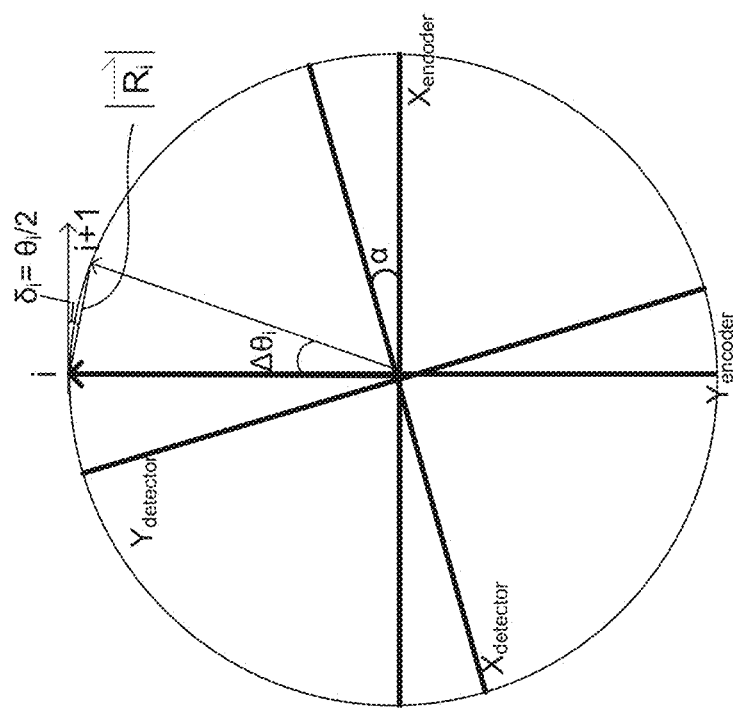
FIG. 12 shows the top view of the rotary encoding body.

Please continuously refer to FIG. 12, where provides the top view of the rotary encoding body 11. It is able to find that the included angle of horizontal axis of the 2D image sensor 125 and the $\Delta d_i'$=$(dx_{Dec,i}', dy_{Dec,i}')$=$\Delta \vec{R_{Dec,1}}$ can be calculated by using the mathematical equation of $$\Delta \theta_{Dec,i} = \tan^{-1}\left(\frac{dy_{Dec,i}}{dx_{Dec,i}}\right).$$

Besides, FIG. 12 also shows that the small circumferential displacement produced as the rotary encoding body 11 is rotated by the constant small angle can be represented by $\Delta d_i$=$(dx_{encoder,i}, dy_{encoder,i})$=$\Delta \vec{R_{encoder,1}}$ and the included angle between $\Delta \vec{R_{encoder,1}}$ and the horizontal axis of the 2D image sensor 125 is $$\Delta \theta_{encoder,i} = \tan^{-1}\left(\frac{dy_{encoder,i}}{dx_{encoder,i}}\right).$$

Moreover, from FIG. 12, it can further find the relation between $\Delta \theta_{encoder,i}$ and $\Delta \theta_{Dec,i}$ can be represented by the equation of $\Delta \theta_{Dec,i}$=$\alpha$+$\Delta \theta_{encoder,i}$+$\Delta \theta_{noise,i}$, wherein $$\Delta \theta_{encoder,i} = \delta_i = \frac{\Delta \theta_i}{2}.$$

On the other hand, since the summation of the constant small angles must be 360° after the rotary encoding body 11 is rotated a full circle, it is able to derive the following equation (1):

$$\Delta \theta_{encoder,1} + \Delta \theta_{encoder,2} + \ldots + \Delta \theta_{encoder,N-1} + \Delta \theta_{encoder,N} =$$
$$\frac{1}{2}(\Delta \theta_1 + \Delta \theta_2 + \ldots + \Delta \theta_N) = \frac{360°}{2}.$$

Moreover, it can simultaneously find the following equation (2) from the 2D image sensor's view angle: $\Sigma_{i=1}^{i=N} \Delta \theta_{Dec,i}$=$\Sigma_{i=1}^{i=N}$ ($\Delta \theta_{encoder,i}$+$\alpha$+$\Delta \theta_{noise,i}$), wherein the $\Delta \theta_{noise,i}$ means the error angle produced by the image capture noise (or sensing noise) of the 2D image sensor 125. Thus, based on above two equations, the mathematical equation for calculating the value of the precision calibration angle α is therefore derived and represented by mathematical formula (2):

$$\Rightarrow \sum_{i=1}^{i=N} \Delta \theta_{Dec,i} = 180° + N\alpha + 0 \Rightarrow \alpha = \frac{\left(\sum_{i=1}^{i=N} \Delta \theta_{Dec,i}\right) - 180°}{N} \quad (2)$$

From the above mathematical equations and formulae, it can find that the value of $\Sigma_{i=1}^{i=N} \Delta \theta_{noise,i}$ must be 0 because the $\Delta \theta_{noise,i}$ is a random number. Therefore, after obtaining the said precision calibration angleα, the controlling and processing module 13 would inform the angle adjusting module 14 to adjust the disposing angle of the 2D image sensor 12 for making a precision calibration angleα be included between the horizontal axis of the 2D image sensor 125 and the horizontal axis of the rotary encoding body 11. Thus, the small circumferential displacement, i.e., the object plane displacement $\Delta d_i$=$(dx_{encoder,i}, dy_{encoder,i})$ produced as the rotary encoding body 11 is rotated by the constant small angle can be precisely calculated by using the α rotation matrix to treating the image displacement $\Delta d_i'$=$(dx_{Dec,i}', dy_{Dec,i}')$ with a displacement vector transforming process. Herein, it needs to further explain that, the precision calibration angle is calculated by the mathematical equation of $\alpha = \dfrac{\left(\sum\limits_{i=1}^{i=N} \Delta\theta_{Dec,i}\right) - 180°}{N}$, wherein $$\Delta\theta_{Dec,i} = \tan^{-1}\left(\dfrac{dy_{Dec,i}}{dx_{Dec,i}}\right).$$

After completing the displacement vector transforming process, it is able to calculating the sub variation angles by using following mathematical equation:

$$\theta_{sub,i} = \Delta d_i \dfrac{360°}{\Sigma D},$$

wherein $\theta_{sub,i}$ represents the sub variation angle, $\Sigma D$ represents the summation of the N number of object plane displacements, and $\Delta d_i$ represents the object plane displacement.

As FIG. 7B and FIG. 7C show, after the step (S05) is finished, the method continuously proceeds to step (S06) for immediately turning the rotary encoding body 11 by an arbitrary angle and simultaneously using the laser speckle image capturing module 12 to capture an immediate laser speckle image frame form the optical position surface 111. Therefore, the controlling and processing module is able to calculate an immediate angle coordinate corresponding to the immediate laser speckle image by using the at least one image comparison library as well as based on the primary variation angles, the secondary variation angles and the N number of image displacements. Particularly, because the N number of primary variation angles and the secondary variation angles have been calculated and stored in the data base of the controlling and processing module 13, the immediate angle coordinate can be easily calculated by using following mathematical equation:

$$\theta_{imm,i} = \theta_i + \theta_{sub,i} = \theta_i + \Delta d_i \dfrac{360°}{\Sigma D},$$

wherein $\theta_{imm,i}$ represents the immediate angle coordinate.

Herein, it needs to further explain that, when using the Agilent® 5530 dynamic calibrator as the angle calibrating module 13a, the angle-positioning error value of the high-precise rotary encoder system 1 proposed by the present invention can be estimated by following formula: angle-positioning error value=an angle comparison error value between $\theta_{imm,i}$ and $\theta_i$+ angle calibration error value of Agilent® 5530=(0.1"+0.5")=0.6", wherein the angle-positioning error value of 0.6" is able to meet the requirement of a high-precision angle sensor.

Embodiment II

Figure 13:
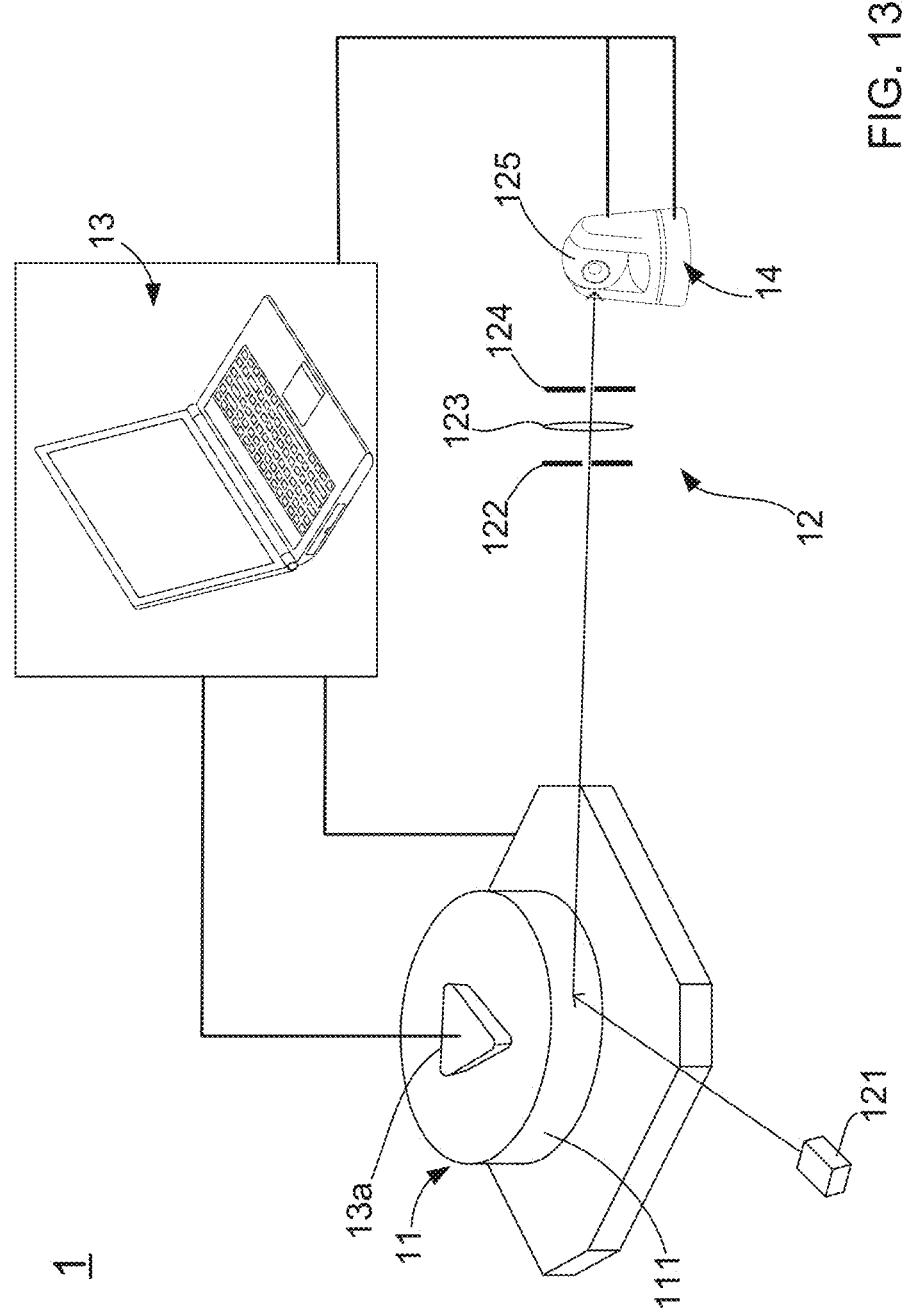
FIG. 13 shows a second framework view of the high-precise rotary encoder system.

Referring to FIG. 13, which illustrates a second framework view of a high-precise rotary encoder system. As shown in FIG. 13, the high-precise rotary encoder system 1 consists of: a rotary encoding body 11, a laser speckle image capturing module 12 having a 2D image sensor 125, a controlling and processing module 13, an angle calibrating module 13a, and an angle adjusting module 14, wherein the rotary encoding body 11 has an optical position surface 111, and the controlling and processing module 13 has at least one image comparison library, at least one mathematical library and a data base. Moreover, the deposing angle adjust module 13a is connected to the 2D image sensor 125 for making a precision calibration angle $\alpha$ be included between the horizontal axis of the 2D image sensor 125 and the horizontal axis of the rotary encoding body 11.

In the second framework, an inertial laser gyroscope is used as the angle calibrating module 13a. Moreover, differing from the first framework, the step (2) of the method applied in the second framework comprises many detail steps. Firstly, it needs to set an image-capturing repetition of the 2D image sensor be ranged from 1 KHz to 10 KHz. Next, the rotary encoding body 11 is controlled to turn a full circle by a rotation speed of 10°/s, and the laser speckle image capturing module 12 is used for capturing the (N+1) frames of the laser speckle image from the optical position surface during the rotation of the rotary encoding body 11. Moreover, during the rotation of the rotary encoding body 11, the controlling and processing module 13 accesses a plurality of period numbers and a plurality of phase coordinates from the beat frequency signal outputted by the inertial laser gyroscope.

Continuously, a first period number corresponding to the first frame of laser speckle image is defined as $k_1=0$, and then a plurality of accumulated period numbers is calculated by using following mathematical equation:

$$k_{ai} = k_i + \dfrac{\varphi_i}{360},$$

wherein $k_{ai}$ represents the accumulated period number and $k_i$ represents the period number and $\phi_i$ represents the phase coordinate. Therefore, the primary variation angles corresponding to the N frames of laser speckle image can be calculated by using following mathematical equation:

$$\theta_i = 360\dfrac{k_{ai}}{\Sigma k},$$

wherein $\theta_i$ represents the primary variation angle and $\Sigma k$ represents a total accumulated period number. Moreover, what is the same to the first framework is that, after obtaining all the primary variation angles by using the mathematical equation of $$\theta_i = 360\dfrac{k_{ai}}{\Sigma k},$$

all the sub variation angles can be calculated by the mathematical equation of $$\theta_{sub,i} = \Delta d_i \dfrac{360°}{\Sigma D}.$$

Figure 14:
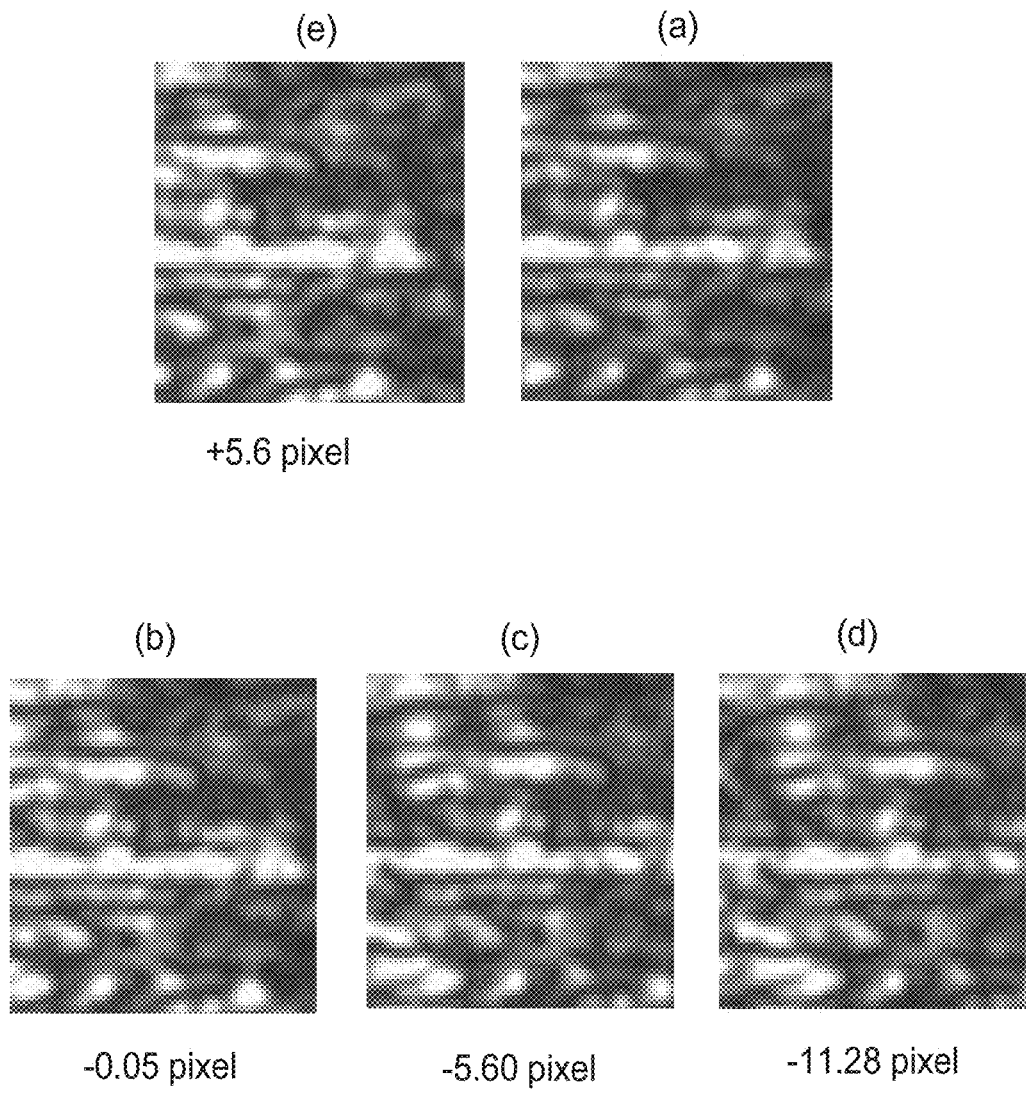
FIG. 14 shows several frames of laser speckle image.

Please refer to FIG. 14, there are shown several frames of laser speckle image. In FIG. 14, image (a) is the immediate laser speckle image; in addition, images (b), (c), (d), and (e) are respectively the i-th frame of laser speckle image, the (i−1)-th frame of laser speckle image, the (i−2)-th frame of laser speckle image, and the (i+1)-th frame of laser speckle image stored in the storage unit. By using the image comparison library, it is able to find that image (b) and image (a) have the a largest overlap region; moreover, the image pixel range of the image (b) does not exceed the image pixel range of the image (a) (−0.05 pixel). On the contrary, the image pixel range of the image (e) exceeds the image pixel range of the image (a) (+5.6 pixel). Thus, it can know that the i-th frame of laser speckle image (i.e., image (b)) is an image-invariant laser speckle images having unique texture feature most similar to the immediate laser speckle image (i.e., image (a)). Therefore, because the primary variation angle of the i-th frame of laser speckle image is $\theta_i$, the immediate angle coordinate of the immediate laser speckle image can be easily calculated by the mathematical equation:

$$\theta_{imm,i} = \theta_i + \theta_{sub,i} = \theta_i + \Delta d_i \frac{360°}{\Sigma D},$$

so as to complete the angle positioning operation.

Herein, it needs to further explain that, when using the inertial laser gyroscope such as Honeywell GG1320 Digital Laser Gyroscope be the angle calibrating module 13a, the angle-positioning error value of the high-precise rotary encoder system 1 proposed by the present invention can also be estimated. Firstly, because the rotational speed of the rotary disk unit 11 is 10°/s, the rotary encoding body 11 spends 36 seconds (i.e., 0.01 hr) turning a full circle, and the bias stability of Honeywell GG1320 Digital Laser Gyroscope is 0.0035 deg/hr, the angle-positioning accuracy of the Honeywell GG1320 Digital Laser Gyroscope can be calculated to 0.0035×0.01=3.5×10$^{-5}$ deg=0.126". So that, the angle-positioning error value of the high-precise rotary encoder system 1 can be calculated to 0.126"+0.2"≤0.4", wherein 0.2" is the angle-position error value between the immediate laser speckle image and the i-th frame of laser speckle image. Therefore, the angle-positioning error value of 0.4" is able to meet the requirement of a high-precision absolute angle positioning sensor.

Embodiment III

Figure 15:
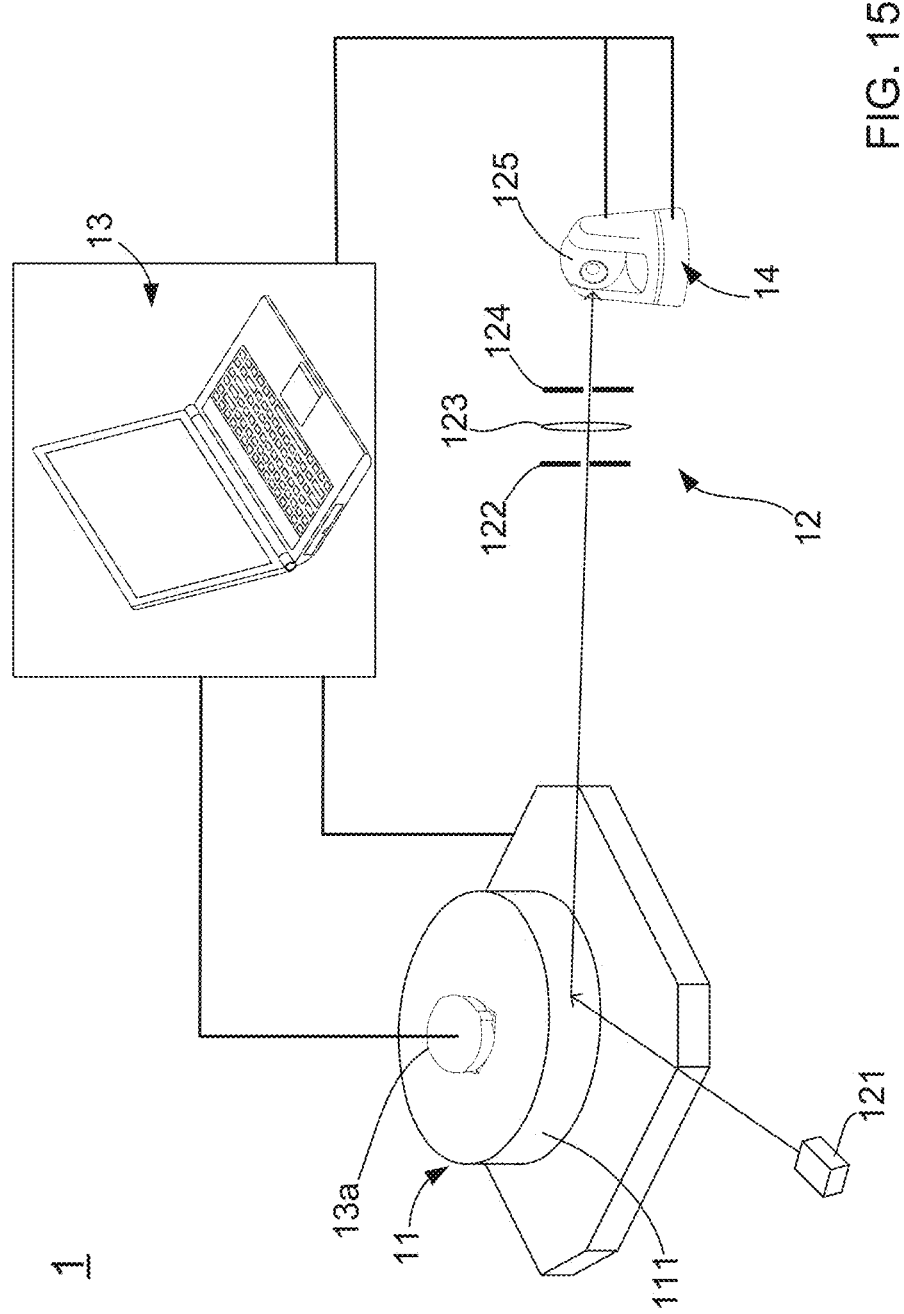
FIG. 15 shows a third framework view of the high-precise rotary encoder system.

Referring to FIG. 15, which illustrates a third framework view of a high-precise rotary encoder system. As shown in FIG. 15, the high-precise rotary encoder system 1 consists of: a rotary encoding body 11, a laser speckle image capturing module 12 having a 2D image sensor 125, a controlling and processing module 13, an angle calibrating module 13a, and an angle adjusting module 14, wherein the rotary encoding body 11 has an optical position surface 111, and the controlling and processing module 13 has at least one image comparison library, at least one mathematical library and a data base. Moreover, the deposing angle adjust module 13a is connected to the 2D image sensor 125 for making a precision calibration angle α be included between the horizontal axis of the 2D image sensor 125 and the horizontal axis of the rotary encoding body 11.

In the third framework, an inertial fiber optic gyroscope is used as the angle calibrating module 13a. Moreover, differing from the first framework, the step (2) of the method applied in the third framework comprises many detail steps. Firstly, it needs to set an image-capturing repetition of the 2D image sensor be ranged from 1 KHz to 10 KHz. Next, the rotary encoding body 11 is controlled to turn a full circle by a rotation speed of 10°/s, and the laser speckle image capturing module 12 is used for capturing the (N+1) frames of the laser speckle image from the optical position surface during the rotation of the rotary encoding body 11. Moreover, during the rotation of the rotary encoding body 11, the controlling and processing module 13 accesses a plurality of calibration angles outputted by the inertial fiber optic gyroscope.

Based on calibration angles, the controlling and processing module 13 calculates the primary variation angles as follows: $\theta_1=\theta_1'=0, \theta_2=\theta_2'-\theta_1', \ldots, \theta_N=\theta_N'-\theta_1'$; wherein $\theta_1$, $\theta_2$ and $\theta_N$ respectively represent a first, a second and a N-th primary variation angle in the N number of primary variation angles, and $\theta_1'$, $\theta_2'$ and $\theta_N'$ respectively represent a first, a second and a N-th calibration angle in the plurality of calibration angles. Therefore, after immediately turning the rotary encoding body 11 by an arbitrary angle and simultaneously using the laser speckle image capturing module 12 to capture an immediate laser speckle image frame form the optical position surface 111, the controlling and processing module 13 is able to calculate an immediate angle coordinate corresponding to the immediate laser speckle image by using the at least one image comparison library as well as based on the primary variation angles, the secondary variation angles and the N number of image displacements. Particularly, because the N number of primary variation angles and the secondary variation angles have been calculated and stored in the data base of the controlling and processing module 13, the immediate angle coordinate can be easily calculated by using following mathematical equation:

$$\theta_{imm,i} = \theta_i + \theta_{sub,i} = \theta_i + \Delta d_i \frac{360°}{\Sigma D},$$

wherein $\theta_{imm,i}$ represents the immediate angle coordinate.

Herein, it needs to further explain that, when using the inertial laser gyroscope such as Honeywell Fiber Optic Gyroscope be the angle calibrating module 13a, the angle-positioning error value of the high-precise rotary encoder system 1 proposed by the present invention can also be estimated. Firstly, because the rotational speed of the rotary encoding body 11 is 10°/s, the rotary encoding body 11 spends 36 seconds (i.e., 0.01 hr) turning a full circle, and the bias stability of Honeywell Fiber Optic Gyroscope is 0.0003 deg/hr, the angle-positioning accuracy of the Honeywell Fiber Optic Gyroscope can be calculated to 0.0003×0.01=3× 10$^{-6}$ deg≈0.01" (=3×10$^{-6}$×60×60 arc second), and the angle-positioning error value of the high-precise rotary encoder system 1 can be calculated to 0.01"+0.2"≤0.3', wherein 0.2" is the angle-position error value between the immediate laser speckle image and the i-th frame of laser speckle image. So that, the angle-positioning error value of 0.3" is able to meet the requirement of a high-precision absolute angle positioning sensor. Moreover, by way of making the positioning accuracy from 0.1 μm to 10 nm or increasing the rotation circumference of the rotary disk unit 11 from 1 m to 10 m, it is possible to make the angle-positioning accuracy of the high-precise rotary encoder system 1 reach 0.03" (=0.01"+ 0.02").

The above description is made on embodiments of the present invention. However, the embodiments are not intended to limit scope of the present invention, and all equivalent implementations or alterations within the spirit of the present invention still fall within the scope of the present invention.

What is claimed is:

1. A precision calibration method for being applied in a high-precise rotary encoder system, comprising:
   (1) providing the high-precise rotary encoder system comprising a rotary encoding body having an optical position surface, a laser speckle image capturing module having a 2D image sensor, an angle calibrating module, a controlling and processing module, and a deposing angle adjust module; wherein the deposing angle adjust module is connected to the 2D image sensor for making a precision calibration angle be included between the horizontal axis of the 2D image sensor and the horizontal axis of the rotary encoding body;
   (2) making the rotary encoding body continuously rotate by a constant small angle until the rotary encoding body rotates a full circle, and using the laser speckle image capturing module to treat a laser speckle image capturing process to the optical position surface during the rotation of the rotary encoding body, so as to obtain N+1 frames of laser speckle image from the optical position surface and then store the N+1 frames of laser speckle image in a data base of the controlling and processing module; moreover, a plurality of primary variation angles being defined by the angle calibrating module as the N+1 frames of laser speckle image is captured;
   (3) using at least one image comparison library comprised by the controlling and processing module to treat a first frame of laser speckle image and a (N+1)-th laser speckle image frame in the N+1 frames of laser speckle image with a key features matching process, so as to calculate a particular image displacement;
   (4) determining whether the particular image displacement is smaller than or equal to a small circumferential displacement produced as the rotary encoding body is rotated by the constant small angle, if yes, proceeding to step (5); otherwise, proceeding to the step (2);
   (5) using the at least one image comparison library to treat each of two adjacent frames of laser speckle image in the N frames of laser speckle image with the key features matching process for obtaining N number of image displacements, and then N number of secondary variation angles corresponding to the N laser speckle image frames and the N number of image displacements being respectively calculated;
   (6) immediately turning the rotary encoding body by an arbitrary angle and simultaneously using the laser speckle image capturing module to capture an immediate laser speckle image frame form the optical position surface; therefore, the controlling and processing module is able to calculate an immediate angle coordinate corresponding to the immediate laser speckle image by using the at least one image comparison library as well as based on the primary variation angles, the secondary variation angles and the N number of image displacements;
   wherein when the step (5) is executed, an α rotation matrix is used for treating the image displacements with a displacement vector transforming process.

2. The precision calibration method of claim 1, wherein when the rotary encoding body is rotated one time by the constant small angle, a circumference displacement of the rotary encoding body must be smaller than 0.5 fold of an image capture range of the 2D image sensor.

3. The precision calibration method of claim 1, wherein the image comparison library is SIFT (Scale Invariant Feature Transform) or SURF (Speed Up Robust Feature).

4. The precision calibration method of claim 1, wherein the said α rotation matrix is represented by following mathematical equation:

$$(dx_{encoder,i}, dy_{encoder,i}) = (dx'_{Dec,i}, dy'_{Dec,i}) \begin{bmatrix} \cos\alpha & -\sin\alpha \\ \sin\alpha & \cos\alpha \end{bmatrix};$$

wherein:
   $(dx_{encoder,i}, dy_{encoder,i}) = \Delta d_i$ represents a small circumferential displacement produced as the rotary encoding body is rotated by the constant small angle;
   $(dx'_{Dec,i}, dy'_{Dec,i}) = \Delta d'_i$ represents a i-th image displacement between a i-th laser speckle image frame and a (i+1)-th laser speckle image frame detected by the 2D image sensor as the small circumferential displacement is produced;
   α represents the precision calibration angle included between the horizontal axis of the 2D image sensor and the horizontal axis of the rotary encoding body, and the precision calibration angle being calculated by following mathematical equation:

$$\alpha = \frac{\left(\sum_{i=1}^{i=N} \Delta\theta_{Dec,i}\right) - 180°}{N},$$

wherein $$\Delta\theta_{Dec,i} = \tan^{-1}\left(\frac{dy'_{Dec,i}}{dx'_{Dec,i}}\right).$$

5. The precision calibration method of claim 1, wherein the angle calibrating module is an Agilent® 5530 dynamic calibrator, moreover, in the step (2), the primary variation angles are defined to $\theta_r \in \{\theta_1, \theta_2, \ldots \theta_{N-1}, \theta_N\}$, wherein $\theta_1 = 0°$.

6. The precision calibration method of claim 1, wherein the angle calibrating module is an inertial laser gyroscope, moreover, the step (2) further comprising following detail steps:
   (21) setting an image-capturing repetition of the 2D image sensor be ranged from 1 KHz to 10 KHz;
   (22) controlling the rotary encoding body to turn a full circle by a rotation speed of 10°/s, and using the laser speckle image capturing module to capture the (N+1) frames of the laser speckle image from the optical position surface during the rotation of the rotary encoding body; moreover, during the rotation of the rotary encoding body, the controlling and processing module accesses a plurality of period numbers and a plurality of phase coordinates from the beat frequency signal outputted by the inertial laser gyroscope;
   (23) letting a first period number corresponding to the first frame of laser speckle image as $k_1=0$, and then obtaining a plurality of accumulated period numbers by following mathematical equation:

$$k_{ai} = k_i + \frac{\varphi_i}{360},$$

wherein $k_{ai}$ represents the accumulated period number, $k_i$ represents the period number and $\phi_i$ represents the phase coordinate;

(24) calculating the primary variation angles corresponding to the N frames of laser speckle image by using following mathematical equation:

$$\theta_i = 360 \frac{k_{ai}}{\Sigma k},$$

wherein $\theta_i$ represents the primary variation angle and $\Sigma k$ represents a total accumulated period number.

7. The precision calibration method of claim 1, wherein the angle calibrating module is an inertial fiber optic gyroscope, moreover, the step (2) further comprising following detail steps:

(21) setting an image-capturing repetition of the 2D image sensor be ranged from 1 KHz to 10 KHz;

(22) controlling the rotary encoding body to turn a full circle by a rotation speed of 10°/s, and using the laser speckle image capturing module to capture the (N+1) frames of the laser speckle image from the optical position surface during the rotation of the rotary encoding body; moreover, during the rotation of the rotary encoding body, the controlling and processing module accesses a plurality of calibration angles outputted by the inertial fiber optic gyroscope;

(23) based on calibration angles, the controlling and processing module calculating the primary variation angles as follows: $\theta_1 = \theta_1' = 0$, $\theta_2 = \theta_2' - \theta_1'$, ..., $\theta_N = \theta_N' - \theta_1'$;

wherein $\theta_1$, $\theta_2$ and $\theta_N$ respectively represent a first, a second and a N-th primary variation angle in the N number of primary variation angles;

wherein $\theta_1'$, $\theta_2'$ and $\theta_N'$ respectively represent a first, a second and a N-th calibration angle in the plurality of calibration angles.

8. The precision calibration method of claim 4, wherein the precision calibration angle is limited by following mathematical equation:

$$\alpha \geq \tan^{-1}\left(\frac{q}{\Sigma \Delta R}\right),$$

wherein q means pixel counts and $\Sigma \Delta R$ represents the positioning circumference length.

9. The precision calibration method of claim 5, wherein the step (5) further comprising following detail steps:

(51) using the at least one image comparison library to treat each of two adjacent frames of laser speckle image in the N frames of laser speckle image with the key features matching process for obtaining the N number of image displacements;

(52) using the α rotation matrix for treating the image displacements with the displacement vector transforming process, so as to obtain N number of object plane displacements;

(53) calculating the sub variation angles by using following mathematical equation:

$$\theta_{sub,i} = \Delta d_i \frac{360°}{\Sigma D},$$

wherein $\theta_{sub,i}$ represents the sub variation angle, $\Sigma D$ represents the summation of the N number of object plane displacements, and $\Delta d_i$ represents the object plane displacement.

10. The precision calibration method of claim 6, wherein the step (5) further comprising following detail steps:

(51) using the at least one image comparison library to treat each of two adjacent frames of laser speckle image in the N frames of laser speckle image with the key features matching process for obtaining the N number of image displacements;

(52) using the α rotation matrix for treating the image displacements with the displacement vector transforming process, so as to obtain N number of object plane displacements;

(53) calculating the sub variation angles by using following mathematical equation:

$$\theta_{sub,i} = \Delta d_i \frac{360°}{\Sigma D},$$

wherein $\theta_{sub,i}$ represents the sub variation angle, $\Sigma D$ represents the summation of the N number of object plane displacements, and $\Delta d_i$ represents the object plane displacement.

11. The precision calibration method of claim 7, wherein the step (5) further comprising following detail steps:

(51) using the at least one image comparison library to treat each of two adjacent frames of laser speckle image in the N frames of laser speckle image with the key features matching process for obtaining the N number of image displacements;

(52) using the α rotation matrix for treating the image displacements with the displacement vector transforming process, so as to obtain N number of object plane displacements;

(53) calculating the sub variation angles by using following mathematical equation:

$$\theta_{sub,i} = \Delta d_i \frac{360°}{\Sigma D},$$

wherein $\theta_{sub,i}$ represents the sub variation angle, $\Sigma D$ represents the summation of the N number of object plane displacements, and $\Delta d_i$ represents the object plane displacement.

12. The precision calibration method of claim 8, wherein the immediate angle coordinate in the step (6) is calculated by using following mathematical equation:

$$\theta_{imm,i} = \theta_i + \theta_{sub,i} = \theta_i + \Delta d_i \frac{360°}{\Sigma D},$$

wherein $\theta_{imm,i}$ represents the immediate angle coordinate.

13. The precision calibration method of claim 9, wherein the immediate angle coordinate in the step (6) is calculated by using following mathematical equation:

$$\theta_{imm,i} = \theta_i + \theta_{sub,i} = \theta_i + \Delta d_i \frac{360°}{\Sigma D},$$

wherein $\theta_{imm,i}$ represents the immediate angle coordinate.

14. The precision calibration method of claim 10, wherein the immediate angle coordinate in the step (6) is calculated by using following mathematical equation:

$$\theta_{imm,i} = \theta_i + \theta_{sub,i} = \theta_i + \Delta d_i \frac{360°}{\Sigma D},$$

wherein $\theta_{imm,i}$ represents the immediate angle coordinate.

* * * * *